US012785771B2

(12) United States Patent
Hao et al.

(10) Patent No.: US 12,785,771 B2
(45) Date of Patent: Nov. 3, 2026

(54) MULTI-SLOT CHANNEL QUALITY INFORMATION (CQI) REPORTING

(71) Applicant: QUALCOMM INCORPORATED, San Diego, CA (US)

(72) Inventors: Chenxi Hao, Beijing (CN); Yu Zhang, San Diego, CA (US); Chao Wei, Beijing (CN); Liangming Wu, Beijing (CN); Hao Xu, Beijing (CN)

(73) Assignee: Qualcomm Incorporated, San Diego, CA (US)

(*) Notice: Subject to any disclaimer, the term of this patent is extended or adjusted under 35 U.S.C. 154(b) by 828 days.

(21) Appl. No.: 18/003,465

(22) PCT Filed: Aug. 17, 2020

(86) PCT No.: PCT/CN2020/109506

§ 371 (c)(1),
(2) Date: Dec. 27, 2022

(87) PCT Pub. No.: WO2022/036497

PCT Pub. Date: Feb. 24, 2022

(65) Prior Publication Data

US 2023/0254022 A1 Aug. 10, 2023

(51) Int. Cl.
*H04B 7/06* (2006.01)

(52) U.S. Cl.
CPC ......... *H04B 7/0626* (2013.01); *H04B 7/0632* (2013.01); *H04B 7/0639* (2013.01)

(58) Field of Classification Search
None
See application file for complete search history.

(56) References Cited

U.S. PATENT DOCUMENTS

2017/0238312 A1* 8/2017 Chen ..................... H04L 1/1812 370/329
2017/0264408 A1* 9/2017 Patel ..................... H04L 5/0037
(Continued)

FOREIGN PATENT DOCUMENTS

CN 102752786 A 10/2012
CN 109478971 A 3/2019
(Continued)

OTHER PUBLICATIONS

Ericsson, "Multi-slot CQI for CLI measurement", Mar. 1, 2019, 3GPP TSG RAN WG1 Meeting 96, R1-1903037, pp. 1-3.*
(Continued)

*Primary Examiner* — Steve R Young
(74) *Attorney, Agent, or Firm* — Holland & Hart LLP / Qualcomm

(57) ABSTRACT

Methods, systems, and devices for wireless communications are described. A user equipment (UE) may identify a channel state information (CSI) report configuration or a trigger for reporting a CSI report. The UE may receive one or more CSI-reference signal (RS) resources associated with the CSI report. The UE may determine, based on a measurement of one or more CSI-RSs, a channel quality for each slot of a set of slots. The UE may transmit, during an uplink transmission
(Continued)

occasion, the CSI report that includes the channel quality for two or more slots of the set of slots. The UE may transmit the CSI report during an uplink transmission occasion.

30 Claims, 17 Drawing Sheets

(56) References Cited

U.S. PATENT DOCUMENTS

| | | | | |
|---|---|---|---|---|
| 2018/0019855 | A1 | 1/2018 | Zhang et al. | |
| 2018/0262313 | A1* | 9/2018 | Nam | H04L 5/0044 |
| 2019/0215136 | A1* | 7/2019 | Zhou | H04B 7/088 |
| 2019/0312622 | A1* | 10/2019 | Fu | H04W 72/0446 |
| 2020/0036424 | A1 | 1/2020 | Kang et al. | |
| 2020/0092055 | A1 | 3/2020 | Choi et al. | |
| 2020/0107309 | A1* | 4/2020 | Akoum | H04W 72/046 |
| 2020/0178241 | A1 | 6/2020 | Wu et al. | |
| 2020/0358502 | A1* | 11/2020 | Faxér | H04W 24/10 |
| 2020/0374877 | A1* | 11/2020 | Shi | H04W 24/10 |
| 2021/0028823 | A1* | 1/2021 | Park | H04B 7/024 |
| 2021/0321446 | A1* | 10/2021 | Lee | H04L 5/0051 |
| 2023/0156502 | A1* | 5/2023 | Sun | H04W 24/10<br>370/252 |

FOREIGN PATENT DOCUMENTS

| | | | |
|---|---|---|---|
| CN | 110945808 | A | 3/2020 |
| EP | 3657705 | A1 | 5/2020 |
| WO | 2010062228 | A1 | 6/2010 |

OTHER PUBLICATIONS

Ericsson: “Multi-Slot CQI for CLI Measurement”, 3GPP Draft, 3GPP TSG RAN WG1 Meeting 96, R1-1903037, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019, XP051600734, 3 pages.

Supplementary European Search Report—EP20949710—Search Authority—The Hague—May 15, 2024.

International Search Report and Written Opinion—PCT/CN2020/109506—ISA/EPO—May 13, 2021.

Lenovo: Summary of Email Discussion [101-e-NR-Unlic-NRU-DL Signals_and_Channels-03] on CSI-RS and Related Aspects, R1-2004853, 3GPP TSG RAN WG1#101-e, Jun. 5, 2020 (Jun. 5, 2020), 43 Pages, the whole document.

* cited by examiner

MULTI-SLOT CHANNEL QUALITY INFORMATION (CQI) REPORTING

CROSS REFERENCE

The present application is a 371 national stage filing of International PCT Application No. PCT/CN2020/109506 by Hao et al. entitled "MULTI-SLOT CHANNEL QUALITY INFORMATION (CQI) REPORTING," filed Aug. 17, 2020, which is assigned to the assignee hereof, and which is expressly incorporated by reference in its entirety herein.

FIELD OF TECHNOLOGY

The following relates to wireless communications, including multi-slot channel quality information (CQI) reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some systems, a UE may provide channel state information (CSI) to a base station, based on which the base station may transmit signals to the UE.

SUMMARY

The described techniques relate to improved methods, systems, devices, and apparatuses that support multi-slot channel quality information (CQI) reporting. Generally, the described techniques provide for channel quality reporting for multiple slots.

A method of wireless communication at a user equipment (UE) is described. The method may include identifying a channel state information (CSI) report configuration or a trigger for reporting a CSI report, receiving one or more CSI-reference signal (RS) resources associated with the CSI report, determining, based on a measurement of one or more CSI-RSs, a channel quality for each slot of a set of slots, and transmitting, during an uplink transmission occasion, the CSI report that includes the channel quality for two or more slots of the set of slots.

An apparatus for wireless communication at a UE is described. The apparatus may include a processor, memory coupled with the processor, and instructions stored in the memory. The instructions may be executable by the processor to cause the apparatus to identify a CSI report configuration or a trigger for reporting a CSI report, receive one or more CSI-RS resources associated with the CSI report, determine, based on a measurement of one or more CSI-RSs, a channel quality for each slot of a set of slots, and transmit, during an uplink transmission occasion, the CSI report that includes the channel quality for two or more slots of the set of slots.

Another apparatus for wireless communication at a UE is described. The apparatus may include means for identifying a CSI report configuration or a trigger for reporting a CSI report, receiving one or more CSI-RS resources associated with the CSI report, determining, based on a measurement of one or more CSI-RSs, a channel quality for each slot of a set of slots, and transmitting, during an uplink transmission occasion, the CSI report that includes the channel quality for two or more slots of the set of slots.

A non-transitory computer-readable medium storing code for wireless communication at a UE is described. The code may include instructions executable by a processor to identify a CSI report configuration or a trigger for reporting a CSI report, receive one or more CSI-RS resources associated with the CSI report, determine, based on a measurement of one or more CSI-RSs, a channel quality for each slot of a set of slots, and transmit, during an uplink transmission occasion, the CSI report that includes the channel quality for two or more slots of the set of slots.

In some examples of the method, apparatuses, and non-transitory computer-readable medium described herein, determining the channel quality for each slot of the set of slots may include operations, features, means, or instructions for measuring, for each slot of the set of slots, a first channel quality associated with a frequency range of the set of slots, and measuring, for each slot of the set of slots, one or more second channel qualities, each associated with a respective subband of the frequency range.

Some examples of the method, apparatuses, and non-transitory computer-readable medium described herein may further include operations, features, means, or instructions for generating and reporting the CSI report to include at least one of a set of first measured channel qualities that each correspond to the first channel quality measured in a respective slot and a set of second measured channel qualities that each correspond to a second channel quality measured across a subband of the respective slot.

In some examples of the method, apparatuses, and non-transitory computer-readable medium described herein, generating the CSI report further may include operations, features, means, or instructions for generating each of the set of first measured channel qualities based on a same CSI-RS resource indicator (CRI), a same pre-coding matrix indicator (PMI), and a same rank information (RI).

In some examples of the method, apparatuses, and non-transitory computer-readable medium described herein, generating the CSI report further may include operations, features, means, or instructions for generating each of the set of second measured channel qualities associated with a same subband based on a same CRI, a same PMI, and a same RI.

In some examples of the method, apparatuses, and non-transitory computer-readable medium described herein, generating the CSI report further may include operations, features, means, or instructions for including, in the CSI report, a first measured channel quality for each slot of the set of slots, and a set of second measured channel qualities for each slot of the set of slots, where each of the second measured channel qualities for a respective slot may be indicated with a delta value with respect to the first measured channel quality for the respective slot.

In some examples of the method, apparatuses, and non-transitory computer-readable medium described herein, generating the CSI report further may include operations, features, means, or instructions for including, in the CSI report, a first measured channel quality for a first slot of the set of slots, first measured channel qualities for additional slots of the set of slots, and a set of second measured channel qualities for each of the set of slots, where each of the first measured channel qualities for the additional slots and each of the set of second measured channel qualities may be indicated with a delta value with respect to the first measured channel quality for the first slot.

In some examples of the method, apparatuses, and non-transitory computer-readable medium described herein, generating the CSI report further may include operations, features, means, or instructions for including, in the CSI report, a first measured channel quality for a first slot of the set of slots, first measured channel qualities for additional slots of the set of slots, a set of second measured channel qualities for the first slot, and a set of second measured channel qualities for the additional slots, where each of the set of second measured channel qualities for the first slot may be indicated with a delta value with respect to the first measured channel quality for the first slot, and where each of the first measured channel qualities for the additional slots and the set of second measured channel qualities for the additional slots may be indicated with a delta value with respect to a corresponding first measured channel quality or second measured channel quality for the first slot.

Some examples of the method, apparatuses, and non-transitory computer-readable medium described herein may further include operations, features, means, or instructions for wherein determining the channel quality for each slot of the set of slots includes determining the channel quality in a CSI reference resource including multiple slots.

Some examples of the method, apparatuses, and non-transitory computer-readable medium described herein may further include operations, features, means, or instructions for determining a quantity of slots included in the CSI reference resource and a slot spacing associated with the quantity of slots based on one or more predetermined values or on a configuration transmitted by a base station via a radio resource control (RRC) message or a media access control (MAC) control element (MAC-CE), and determining the set of slots based on the determining the quantity of slots and the slot spacing.

In some examples of the method, apparatuses, and non-transitory computer-readable medium described herein, the slot spacing may be equal to a quantity of zero slots between a slot of the set of slots and another slot of the set of slots.

In some examples of the method, apparatuses, and non-transitory computer-readable medium described herein, the slot spacing may be equal to a quantity of one or more slots between a slot of the set of slots and another slot of the set of slots.

Some examples of the method, apparatuses, and non-transitory computer-readable medium described herein may further include operations, features, means, or instructions for determining a location of the CSI reference resource based on a quantity of slots between a last slot of the CSI reference resource and an uplink slot for transmitting the CSI report.

Some examples of the method, apparatuses, and non-transitory computer-readable medium described herein may further include operations, features, means, or instructions for determining the quantity of slots between the last slot of the CSI reference resource and the uplink slot based on a reporting type associated with the CSI report, where the reporting type includes periodic reporting, semi-persistent reporting, or aperiodic reporting.

Some examples of the method, apparatuses, and non-transitory computer-readable medium described herein may further include operations, features, means, or instructions for determining channel quality information (CQI) for each slot of the multiple slots of the CSI reference resource assuming a same slot format for each slot of the multiple slots, where the slot format includes at least one or more of.

In some examples of the method, apparatuses, and non-transitory computer-readable medium described herein, the one or more CSI-RS resources may be aperiodic CSI-RS resources, and the method further including receiving a multi-shot transmission for each of the one or more CSI-RS resources over a second set of slots at least partially overlapping the set of slots, where each shot of the multi-shot transmission may be transmitted in one slot of the set of slots.

In some examples of the method, apparatuses, and non-transitory computer-readable medium described herein, a quantity of shots of the multi-shot transmission and a slot spacing of the multi-shot transmission may be configured by a network via a RRC message or a MAC-CE.

In some examples of the method, apparatuses, and non-transitory computer-readable medium described herein, the one or more CSI-RS resources may be periodic or semi-persistent CSI-RS resources, and the method further including, for each transmission occasion of each of the periodic or semi-persistent CSI-RS resources, receiving a multi-shot transmission for each of the one or more CSI-RS resources over a second set of slots at least partially overlapping the set of slots, where each shot of the multi-shot transmission may be transmitted in one slot of the second set of slots.

In some examples of the method, apparatuses, and non-transitory computer-readable medium described herein, a quantity of shots of the multi-shot transmission and a slot spacing of the multi-shot transmission may be configured by a network via a RRC message or a MAC-CE.

Some examples of the method, apparatuses, and non-transitory computer-readable medium described herein may further include operations, features, means, or instructions for receiving a configuration indicating that the one or more CSI-RS resources may be transmitted via repetition, where the transmission via repetition includes that the one or more CSI-RS resources may be transmitted using a same spatial transmission filter.

In some examples of the method, apparatuses, and non-transitory computer-readable medium described herein, each of the one or more CSI-RS resources may be transmitted in a slot of a second set of slots at least partially overlapping the set of slots.

Some examples of the method, apparatuses, and non-transitory computer-readable medium described herein may further include operations, features, means, or instructions for identifying, from a CSI reference resource including multiple slots, an invalid slot for CQI calculation, and refraining from determining the channel quality during the identified invalid slot.

Some examples of the method, apparatuses, and non-transitory computer-readable medium described herein may further include operations, features, means, or instructions for identifying a valid slot, where the identified valid slot precedes or follows the identified invalid slot, and measuring the channel quality for the identified valid slot.

In some examples of the method, apparatuses, and non-transitory computer-readable medium described herein, the CSI report configuration includes a multi-slot CQI configuration.

Some examples of the method, apparatuses, and non-transitory computer-readable medium described herein may further include operations, features, means, or instructions for receiving the one or more CSI-RSs over a second set of slots at least partially overlapping the set of slots, and where determining the channel quality for each slot of the second set of slots includes determining multi-slot CQI over the second set of slots, where determining the multi-slot CQI includes determining CQI for each slot of the second set of slots.

A method of wireless communication at a base station is described. The method may include transmitting a CSI report configuration or a trigger for reporting a CSI report, transmitting one or more CSI-RS resources associated with the CSI report, and receiving, during an uplink transmission occasion, the CSI report that includes a measured channel quality for two or more slots of a set of slots.

An apparatus for wireless communication at a base station is described. The apparatus may include a processor, memory coupled with the processor, and instructions stored in the memory. The instructions may be executable by the processor to cause the apparatus to transmit a CSI report configuration or a trigger for reporting a CSI report, transmit one or more CSI-RS resources associated with the CSI report, and receive, during an uplink transmission occasion, the CSI report that includes a measured channel quality for two or more slots of a set of slots.

Another apparatus for wireless communication at a base station is described. The apparatus may include means for transmitting a CSI report configuration or a trigger for reporting a CSI report, transmitting one or more CSI-RS resources associated with the CSI report, and receiving, during an uplink transmission occasion, the CSI report that includes a measured channel quality for two or more slots of a set of slots.

A non-transitory computer-readable medium storing code for wireless communication at a base station is described. The code may include instructions executable by a processor to transmit a CSI report configuration or a trigger for reporting a CSI report, transmit one or more CSI-RS resources associated with the CSI report, and receive, during an uplink transmission occasion, the CSI report that includes a measured channel quality for two or more slots of a set of slots.

In some examples of the method, apparatuses, and non-transitory computer-readable medium described herein, the identifying may include operations, features, means, or instructions for identifying, for each slot of the two or more slots, a measured first channel quality associated with a frequency range of the two or more slots, and identifying, for each slot of the two or more slots, one or more measured second channel qualities, each associated with a respective subband of the frequency range.

In some examples of the method, apparatuses, and non-transitory computer-readable medium described herein, the CSI report further may include operations, features, means, or instructions for a set of first measured channel qualities that each correspond to the first channel quality measured in a respective slot and a set of second measured channel qualities that each correspond to a second channel quality measured across a subband of the respective slot.

In some examples of the method, apparatuses, and non-transitory computer-readable medium described herein, each of the set of first measured channel qualities may be based on a same CRI, a same PMI, and a same RI.

In some examples of the method, apparatuses, and non-transitory computer-readable medium described herein, each of the set of second measured channel qualities associated with a same subband may be based on a same CRI, a same PMI, and a same RI.

In some examples of the method, apparatuses, and non-transitory computer-readable medium described herein, the CSI report further may include operations, features, means, or instructions for a first measured channel quality for each slot of the two or more slots, and a set of second measured channel qualities for each slot of the two or more slots, where each of the second measured channel qualities for a respective slot may be indicated with a delta value with respect to the first measured channel quality for the respective slot.

In some examples of the method, apparatuses, and non-transitory computer-readable medium described herein, the CSI report further may include operations, features, means, or instructions for a first measured channel quality for a first slot of the two or more slots, first measured channel qualities for additional slots of the two or more slots, and a set of second measured channel qualities for each of the two or more slots, where each of the first measured channel qualities for the additional slots and each of the set of second measured channel qualities may be indicated with a delta value with respect to the first measured channel quality for the first slot.

In some examples of the method, apparatuses, and non-transitory computer-readable medium described herein, the CSI report further may include operations, features, means, or instructions for a first measured channel quality for a first slot of the two or more slots, first measured channel qualities for additional slots of the two or more slots, a set of second measured channel qualities for the first slot, and a set of second measured channel qualities for the additional slots, where each of the set of second measured channel qualities for the first slot may be indicated with a delta value with respect to the first measured channel quality for the first slot, and where each of the first measured channel qualities for the additional slots and the set of second measured channel qualities for the additional slots may be indicated with a delta value with respect to a corresponding first measured channel quality or second measured channel quality for the first slot.

In some examples of the method, apparatuses, and non-transitory computer-readable medium described herein, the measured channel quality for each slot of the two or more slots may be measured in a CSI reference resources including multiple slots.

Some examples of the method, apparatuses, and non-transitory computer-readable medium described herein may further include operations, features, means, or instructions for transmitting a configuration indicating a quantity of slots included the CSI reference resource and a slot spacing associated with the quantity of slots via a RRC message or a MAC-CE, and where the set of slots may be determined by a UE based on one or more predetermined values or on the configuration indicating the quantity of slots and the slot spacing.

In some examples of the method, apparatuses, and non-transitory computer-readable medium described herein, the slot spacing may be equal to a quantity of zero slots between a slot of the set of slots and another slot of the set of slots.

In some examples of the method, apparatuses, and non-transitory computer-readable medium described herein, the slot spacing may be equal to a quantity of one or more slots between a slot of the set of slots and another slot of the set of slots.

In some examples of the method, apparatuses, and non-transitory computer-readable medium described herein, a location of the CSI reference resource may be determined by a UE based on a quantity of slots between a last slot of the CSI reference resource and an uplink slot for transmitting the CSI report.

Some examples of the method, apparatuses, and non-transitory computer-readable medium described herein may further include operations, features, means, or instructions for transmitting an indication of a reporting type associated with the CSI report, where the reporting type includes periodic reporting, semi-persistent reporting, or aperiodic reporting, and where the quantity of slots between the last slot of the CSI reference resource and the uplink slot may be determined by the UE based on the reporting type.

In some examples of the method, apparatuses, and non-transitory computer-readable medium described herein, receiving the CSI report may include operations, features, means, or instructions for receiving CQI for each slot of the multiple slots of the CSI reference resource, where the CQI for each slot may be determined assuming a same slot format for each slot of the multiple slots, where the slot format includes at least one or more of.

In some examples of the method, apparatuses, and non-transitory computer-readable medium described herein, the one or more CSI-RS resources may be aperiodic CSI-RS resources, and the method further including transmitting a multi-shot transmission for each of the one or more CSI-RS resources over a second set of slots at least partially overlapping the set of slots, where the transmitting includes transmitting each shot of the multi-shot transmission in one slot of the set of slots.

In some examples of the method, apparatuses, and non-transitory computer-readable medium described herein, a quantity of shots of the multi-shot transmission and a slot spacing of the multi-shot transmission may be configured by a network via a RRC message or a MAC-CE.

In some examples of the method, apparatuses, and non-transitory computer-readable medium described herein, the one or more CSI-RS resources may be periodic or semi-persistent CSI-RS resources, and the method further including, for each transmission occasion of each of the periodic or semi-persistent CSI-RS resources, transmitting a multi-shot transmission for each of the one or more CSI-RS resources over a second set of slots at least partially overlapping the set of slots, where the transmitting includes transmitting each shot of the multi-shot transmission in one slot of the second set of slots.

In some examples of the method, apparatuses, and non-transitory computer-readable medium described herein, a quantity of shots of the multi-shot transmission and a slot spacing of the multi-shot transmission may be configured by a network via a RRC message or a MAC-CE.

In some examples of the method, apparatuses, and non-transitory computer-readable medium described herein, transmitting the one or more CSI-RS resources may include operations, features, means, or instructions for transmitting the one or more CSI-RS resources via repetition, where transmitting via the repetition includes transmitting the one or more CSI-RS resources using a same spatial transmission filter, and the method further including transmitting a configuration indicating that the one or more CSI-RS resources may be transmitted via repetition.

Some examples of the method, apparatuses, and non-transitory computer-readable medium described herein may further include operations, features, means, or instructions for transmitting each of the one or more CSI-RS resources in a slot of a second set of slots at least partially overlapping the set of slots.

In some examples of the method, apparatuses, and non-transitory computer-readable medium described herein, the CSI report configuration includes a multi-slot CQI configuration.

Some examples of the method, apparatuses, and non-transitory computer-readable medium described herein may further include operations, features, means, or instructions for transmitting the one or more CSI-RSs over a second set of slots at least partially overlapping the set of slots, and where the measured channel quality for the two or more slots of the second set of slots includes multi-slot CQI determined over the second set of slots, the multi-slot CQI including CQI determined for each slot of the second set of slots.

DETAILED DESCRIPTION

Figure 1:
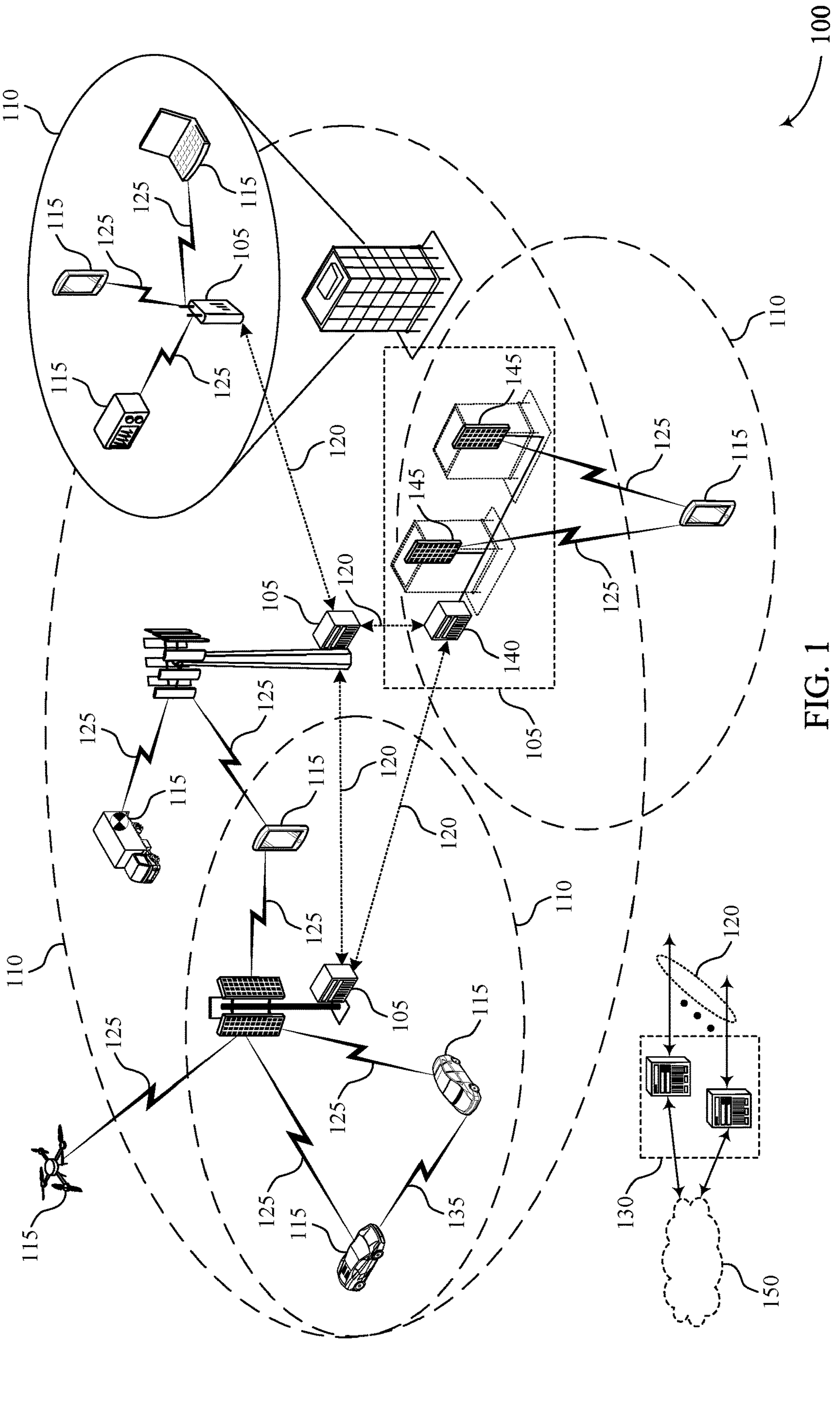
FIG. 1 illustrates an example of a system for wireless communications that supports multi-slot channel quality information (CQI) reporting in accordance with aspects of the present disclosure.

In some systems, a base station may transmit signals to a user equipment (UE) using a modulation and coding scheme (MCS) for the transmissions (e.g., downlink data transmissions such as physical downlink shared channel (PDSCH) transmissions). The base station may determine and apply an appropriate MCS for each transmission based on channel state information (CSI) provided by the UE. In some cases, the CSI may be determined by the UE as a result of the UE measuring a reference signal provided by the base station. Thus, the appropriateness of the applied MCS may be based on the quality of measurements of reference signals as made by the UE.

When a UE is highly mobile, thus resulting in a high Doppler effect, measuring and reporting CSI based on a single reference signal may be insufficient to account for changes arising from a quick-moving UE (e.g., a UE moving above a speed threshold). For example, the CSI feedback provided based on a single reference signal when the UE is highly mobile may inaccurately represent channel quality (e.g., due to channel variations or channel aging).

Measurement of multiple CSI reference signals (RSs) in different slots and reporting the same may assist in improving the accuracy of a base station determination of an MCS. Differences in reported channel quality information (CQI) for different CSI-RS measurements may be useful to a base station in identifying differences in MCS over time. In other words, successive CSI-RS measurements in different slots may allow a base station to determine an effective "rate of change" in the CQI, and thus extrapolate to a potential rate of change for MCS over a similar number of slots.

To that end, a UE may identify a CSI report configuration or a CSI report trigger (e.g., a trigger for providing a CSI report to a base station). The UE may receive one or more CSI-RS resources associated with the CSI report. The UE may determine, based on a measurement of one or more CSI reference signals received over the set of slots, a channel quality for each of the slots. The UE may transmit, during an uplink transmission occasion, the CSI report that includes the channel quality (e.g., CQI) for two or more slots of a set of slots.

In an example, for each of the slots, the UE may measure at least one of a first channel quality (e.g., a wideband CQI) associated with a frequency range of the set of slots and one or more second channel qualities (e.g., subband CQIs), each associated with a respective subband of the frequency range. In some aspects, the UE may provide differential reporting (e.g., using delta values) for reporting the measured channel quality for each of the slots. In the CSI report, the delta values may represent the difference between different rows and/or columns, with each column including measurements for a given slot and each row including measurements for a given frequency sub-band or wideband.

The base station may determine, from the multi-slot CSI report, how channel quality is changing on a slot-by-slot basis. In some cases, if the base station assumes that the rate of change in channel quality remains constant, the base station may adjust the MCS for successive transmissions based on the multi-slot CSI report. In some cases, the base station may determine a set of MCSs for a set of downlink data transmissions (e.g., PDSCH transmission) based on receiving the CSI report or on other criteria (e.g., based on network implementation). The base station may transmit (and the UE may receive and decode) the set of downlink data transmissions (e.g., PDSCH transmissions) during a transmission occasion (e.g., a downlink transmission occasion) based on the set of MCSs.

Aspects of the subject matter described herein may be implemented to realize one or more advantages. The described techniques may support improvements in spectral efficiency and reliability, among other advantages. In some aspects, generating a multi-slot CSI report that includes respective CQI for each measured slot may provide increased accuracy for the CSI report. In some aspects, providing differential reporting (e.g., using delta values) for reporting the measured channel quality may provide advantages such as reduced data usage and increased throughput. In some cases of differential reporting in which the base station assumes the rate of channel quality change remains constant, the base station may accordingly adjust the MCS for successive transmissions (e.g., downlink data transmissions, for example, physical downlink shared channel (PDSCH) transmissions) based on the multi-slot CSI report. Accordingly, the UE may successfully receive and decode the successive transmissions, which may reduce unnecessary retransmissions, increase throughput, and reduce latency.

Aspects of the disclosure are initially described in the context of a wireless communications system. Examples of processes and signaling exchanges that support multi-slot CQI reporting are then described. Aspects of the disclosure are further illustrated by and described with reference to apparatus diagrams, system diagrams, and flowcharts that relate to multi-slot CQI reporting.

FIG. 1 illustrates an example of a wireless communications system 100 that supports multi-slot CQI reporting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control or media access control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may identify a CSI report configuration or a CSI report trigger (e.g., a trigger for providing a CSI report to a base station 105). In an example, the UE 115 may receive the CSI report configuration or the CSI report trigger from the base station 105. In some aspects, for a periodic CSI report, UE 115 may receive a CSI report configuration via RRC indicating the periodic CSI report, and the UE 115 may report CSI per periodicity and slot offset indicated in the CSI report configuration. In some cases, for a semi-persistent (SP) CSI report, the UE 115 may receive a CSI report configuration via RRC indicating the semi-persistent CSI report, and the UE 115 may further receive a MAC-CE activating the SP-CSI report or receive a downlink control information (DCI) activating the SP-CSI report. Once receiving the activation command, the UE 115 may start to report the SP-CSI with a periodicity and offset configured in the RRC signaling. The UE 115 may further receive a MAC-CE or DCI to deactivate the SP-CSI report. In some examples, for an aperiodic CSI (A-CSI) report, the UE 115 may receive a CSI report configuration via RRC indicating the A-CSI report, the UE 115 may further receive a DCI triggering the A-CSI report. Once triggered, the UE 115 may report the A-CSI. The UE 115 may receive one or more CSI-RS resources associated with the CSI report. In some aspects, the UE 115 may monitor the CSI-RS resources for a set of CSI reference signals. In some aspects, the UE 115 may determine, based on a measurement of one or more CSI reference signals received over the set of slots, a channel quality for each of the slots. The UE 115 may transmit, during an uplink transmission occasion, the CSI report that includes the channel quality (e.g., CQI) for two or more slots of a set of slots.

In an example, for each of the slots, the UE 115 may measure at least one of a first channel quality (e.g., a wideband CQI) associated with a frequency band of the set of slots and one or more second channel qualities (e.g., subband CQIs), each associated with a respective subband of the frequency band. For example, if configured with wideband CQI reporting, the UE 115 may report wideband CQI for each slot of the set of slots. In another example, if configured with subband CQI reporting, the UE 115 may report a wideband CQI and a differential CQI (relative to the WB CQI) for each subband. In some aspects, the UE 115 may provide differential reporting (e.g., using delta values) for reporting the measured channel quality for each of the slots. In the CSI report, the delta values may represent the difference between different rows and/or columns, with each column including measurements for a given slot and each row including measurements for a given frequency sub-band or wideband.

The base station 105 may determine, from the CSI report (e.g., multi-slot CSI report), how channel quality is changing on a slot-by-slot basis. In some aspects, the base station 105 may determine a set of MCSs for a set of downlink data transmissions (e.g., PDSCH transmission) based on the CSI report or on criteria other than the CSI report (e.g., based on network implementation). The set of MCSs may include a respective MCS for each downlink data transmission (e.g., PDSCH transmission) in the set. The base station 105 may transmit DCI to the UE 115 indicating the set of MCSs and the set of downlink data transmissions (e.g., PDSCH transmissions). Accordingly, the base station 105 may transmit (and the UE 115 may receive and decode) the set of downlink data transmissions (e.g., PDSCH transmissions) during a transmission occasion (e.g., a downlink transmission occasion) based on the set of MCSs.

Figure 2:
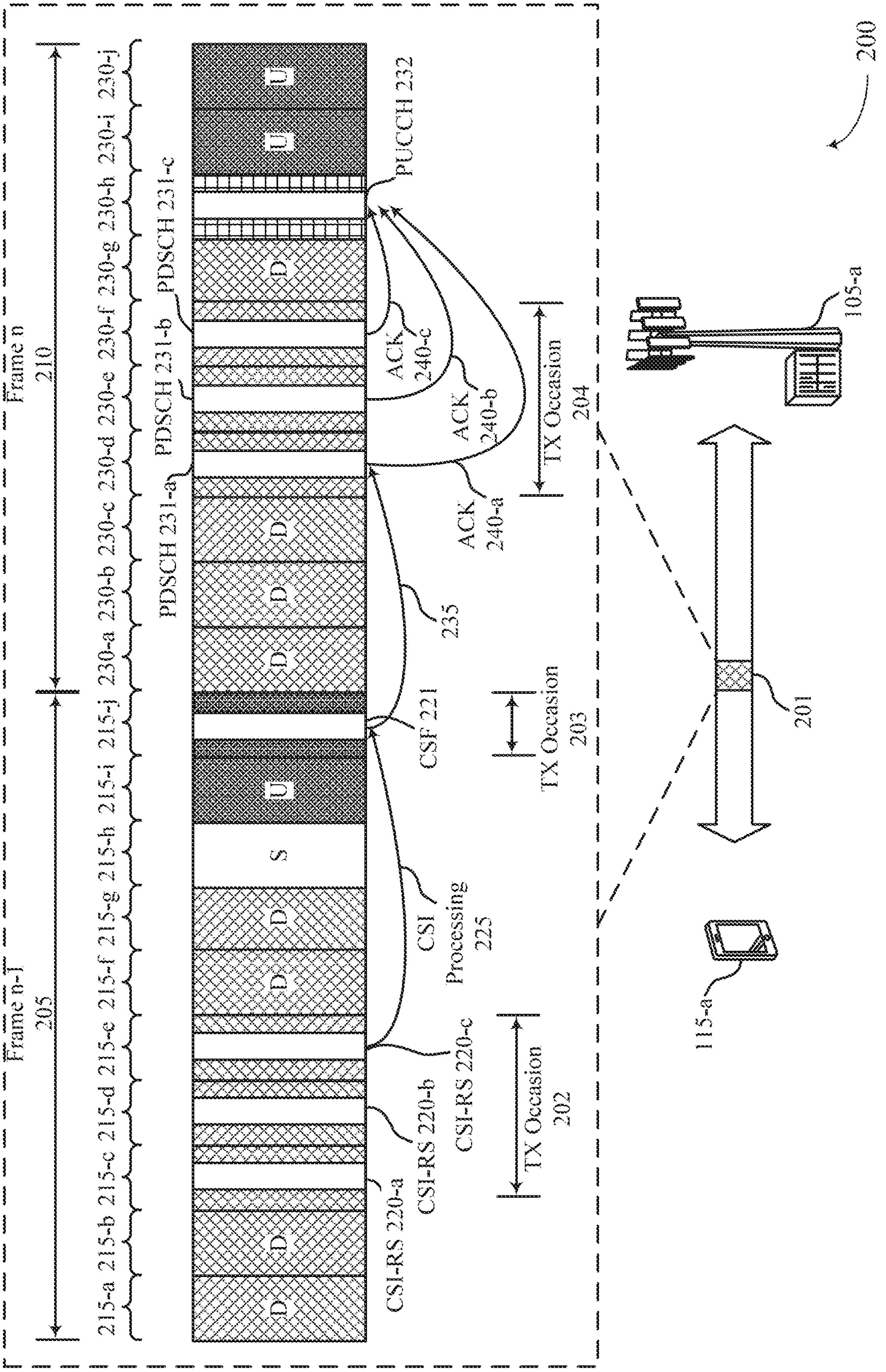
FIG. 2 illustrates an example of a system for wireless communication that supports multi-slot CQI reporting in accordance with aspects of the present disclosure.

FIG. 2 illustrates an example of a wireless communications system 200 that supports multi-slot CQI reporting in accordance with aspects of the present disclosure. In some examples, the wireless communications system 200 may implement aspects of the wireless communications system 100 and may include a UE 115 *a* and a base station 105 *a*, which may be examples of a UE 115 and a base station 105, respectively, described with reference to FIG. 1. FIG. 2 illustrates an example of communications 201 between the UE 115 *a* and the base station 105 *a*.

Referring to FIG. 2, the UE 115-*a* and the base station 105-*a* may communicate based on a slot configuration indicating a frame structure or slot format. For example, a frame 205 (e.g., frame n−1) may have a frame structure or slot format DDDDDDDSUU, in which slot 215-*a* through slot 215-*g* are downlink slots, slot 215-*h* is a special slot (e.g., a slot including 14 symbols and a guard period), and slot 215-*i* and 215-*j* are uplink slots. In some aspects, the frame structure or slot format (e.g., DDDDDDDSUU) may be applied to additional frames (e.g., subsequent frames in the time domain). For example, a frame 210 (e.g., frame n) may include slots 230 (e.g., slot 230-*a* through slot 230-*j*), in which slot 230-*a* through slot 230-*g* are downlink slots, slot 230-*h* is a special slot (e.g., a slot including 14 symbols and a guard period), and slot 230-*i* and 230-*j* are uplink slots. Slots 230 may include aspects of slots 215.

The UE 115-*a* may identify a CSI report configuration or a CSI report trigger (e.g., a trigger for providing a CSI report to the base station 105-*a*). In an example, the UE 115-*a* may receive the CSI report configuration or the CSI report trigger from the base station 105-*a*. The UE 115-*a* may receive one or more CSI-reference signal (RS) resources associated with the CSI report. In some aspects, the UE 115-*a* may monitor the CSI-RS resources for a set of CSI reference signals (e.g., CSI-RS 220-*a* through CSI-RS 220-*c*).

In some aspects, the UE 115-*a* may receive the CSI-RS resources (e.g., for monitoring for CSI-RS 220-*a* through CSI-RS 220-*c*) during a downlink transmission occasion 202. The UE 115-*a* may transmit a CSI report that includes the channel quality for two or more of the slots 215 (e.g., two or more of slot 215-*c* through slot 215-*e*). In some aspects, the UE 115-*a* may transmit the CSI report during an uplink transmission occasion 203 (e.g., during slot 215-*j*). The slots 215 and the frame 205 may include aspects of slots and frames described herein with reference to FIG. 1.

In some aspects, the UE 115-*a* may determine, based on a measurement of one or more CSI reference signals (e.g., CSI-RS 220-*a* through CSI-RS 220-*c*), a channel quality for each slot of a set of slots 215 (e.g., slot 215-*c* through slot 215-*e*). In some examples, the UE 115-*a* may receive the one or more CSI reference signals (e.g., CSI-RS 220-*a* through CSI-RS 220-*c*) over the set of slots 215 (e.g., slot 215-*c* through slot 215-*e*). The UE 115-*a* may determine multi-slot channel CQI for slots 215 over which CSI reference signals are transmitted by the base station 105-*a* (e.g., slots 215 over which CSI reference signals are received by the UE 115-*a*). In an example, the CSI report configuration received by the UE 115-*a* may include a multi-slot CQI configuration. The UE 115-*a* may determine CQI over a multi-slot CSI reference resource (i.e., slot 215-*c* through slot 215-*e*). In some case, CSI-RSs may not overlap with the multi-slot CSI reference resource. In some case, CSI-RS 220-*a* through to 220-*c* may overlap with the multi-slot CSI reference resource. UE 115 may determine CQI for each slot of the set of slots 215 comprised in the CSI reference resource (i.e., each of slot 215-*c* through slot 215-*e*).

Each of the set of CSI reference signals (e.g., CSI-RS 220-*a* through CSI-RS 220-*c*) may be associated with a respective one of the set of slots 215 (e.g., slot 215-*c* through slot 215-*e*). In some alternative aspects, each of the set of CSI reference signals (e.g., CSI-RS 220-*a* through CSI-RS 220-*c*) may not be associated with a respective one of the set of slots 215 (e.g., slot 215-*c* through slot 215-*e*). For example, the set of slots 215 (e.g., slot 215-*c* through slot 215-*e*) of the set of CSI reference signals (e.g., CSI-RS 220-*a* through CSI-RS 220-*c*) may or may not align with a set of slots of a CSI reference resource. In some aspects, the set of slots 215 (e.g., slot 215-*c* through slot 215-*e*) of the set of CSI reference signals (e.g., CSI-RS 220-*a* through CSI-RS 220-*c*) may at least partially overlap with the set of slots of the CSI reference resource. Example aspects of the CSI reference resource will be described later herein.

The UE 115-*a* may measure a channel quality (e.g., channel quality information (CQI), where CQI may also be referred to as a channel quality indicator) for each of the slots 215 (e.g., each of slot 215-*c* through slot 215-*e*) based CSI measurements of the set of CSI reference signals (e.g., CSI-RS 220-*a* through CSI-RS 220-*c*). The UE 115-*a* may transmit a CSI report (e.g., a CSI report including CSI feedback (CSF)) to the base station 105-*a* based on measuring the channel quality. In some aspects, the UE 115 may first identify where to transmit the CSI report, and based on the identifying, determine the location of the CSI ref resource (denoting the UL slot of CSI reporting is n', then the CSI reference resource is at slot $n-n_{ref}$, where $$n = \left\lfloor n' \cdot \frac{2^{\mu_{DL}}}{2^{\mu_{UL}}} \right\rfloor$$

and $\mu_{DL}$ and $\mu_{UL}$ respectively denote the subcarrier spacing (SCS) of the carrier of CSI measurement and the carrier of the CSI reporting). For example, n_ref slots (also referred to herein as n_CSI_ref slots, for example, with reference to FIG. 3) may be equal to five (5) slots (e.g., as shown by 225). In an example, the UE 115-*a* may transmit the CSI report to the base station 105-*a* during the uplink transmission occasion 203. In some examples, the UE 115-*a* may transmit the CSI report to the base station 105-*a* within CSF 221 of slot 215-*j* (e.g., a CSI reporting slot).

In some aspects, for periodic or semi-persistent CSI reporting, the CSI ref resource may be n_ref=smallest integer greater than or equal to four (4) slots (assuming same SCS for the carrier of CSI reporting and the carrier of CSI measurement; alternatively, for a different SCS for the carrier of CSI reporting and the carrier of CSI measurement, n_ref may be calculated based on an equation $n_{ref}=4\cdot 2^{\mu_{DL}}$) before the CSI reporting slot if there is single CSI report to be transmitted and slot n-n_ref is a valid downlink slot. In some cases, if there are multiple CSI reports to be transmitted, the CSI ref resource may be n_ref=five smallest integer greater than or equal to (5) slots (assuming same SCS for the carrier of CSI reporting and the carrier of CSI measurement; alternatively, for a different SCS for the carrier of CSI reporting and the carrier of CSI measurement, n_ref may be calculated based on an equation $n_{ref}=5\cdot 2^{\mu_{DL}}$) before the CSI reporting slot and slot n-n_ref is a valid downlink slot. For aperiodic CSI reports, the CSI ref resource may be n_ref=smallest integer greater than or equal to floor (Z'/14) slots before the CSI reporting slot and slot n-n_ref is a valid downlink slot. Z' is an A-CSI processing timeline, determined by several matters. If there is WB CSI<=four (4) ports, single CSI-RS resource, no uplink data, no HARQ-ACK, no central processing unit (CPU) occupied before processing the CSI, a fast timeline (Table 1 below) may be used.

TABLE 1

| | $Z_1$ [symbols] | |
|---|---|---|
| μ | $Z_1$ | $Z'_1$ |
| 0 | 10 | 8 |
| 1 | 13 | 11 |
| 2 | 25 | 21 |
| 3 | 43 | 36 |

Otherwise, if WB CSI<=four (4) ports, single CSI-RS resource, Type I CSI or non-PMI based CSI reporting, Z1' value in the low timeline table may be used. Otherwise, if the CSI reporting is beam-management related reporting, Z3' value in the low timeline table may be used. Otherwise, Z2' in low timeline table (Table 2 below) may be used.

TABLE 2

| | $Z_1$ [symbols] | | $Z_2$ [symbols] | | $Z_3$ [symbols] | |
|---|---|---|---|---|---|---|
| μ | $Z_1$ | $Z'_1$ | $Z_2$ | $Z'_2$ | $Z_3$ | $Z'_3$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min(44, $X_3 + KB_1$) | $X_3$ |
| 3 | 97 | 85 | 152 | 140 | min(97, $X_4 + KB_2$) | $X_4$ |

Accordingly, in some aspects, n_ref may be used for multi-slot CSI ref resource, where the last slot of the multi-slot CSI ref resource is n_ref before the CSI reporting (i.e., the CSI reporting slot), where n_ref may follow the same rule described above. More specifically, denoting the uplink slot of CSI reporting is n', then the last slot of the multi-slot CSI reference resource is at slot $n-n_{ref}$, where $$n = \left\lfloor n' \cdot \frac{2^{\mu_{DL}}}{2^{\mu_{UL}}} \right\rfloor$$

and $\mu_{DL}$ and $\mu_{UL}$ respectively denote the SCS of the carrier of CSI measurement and the carrier of the CSI reporting.

The CSI report may include multi-slot CQI for reporting channel quality variation (e.g., CQI variation) across the set of slots 215 (e.g., slot 215-*c* through slot 215-*e*). For example, the CSI report may include the measured channel quality for measured slots of the set of slots 215. In some examples, the CSI report may include respective CQI for two or more of slot 215-*c* through slot 215-*e*. In some aspects, the CSI report may include a first channel quality (e.g., a wideband CQI) associated with a frequency range (e.g., a wideband). In some other aspects, the CSI report may include one or more second channel qualities (e.g., subband CQIs), each associated with a respective subband of the frequency range. Example aspects of the first channel quality and second channel qualities are described herein. In an example, the CSI report may include a pre-coding matrix indicator (PMI) and corresponding CQI for three (3) sets of CSI-RS resources (e.g., CSI-RS resources respectively corresponding to slot 215-*c* through slot 215-*e*). In some aspects, the CSI report may include a CSI-RS resource indicator (CRI), a CQI, a PMI, and rank information (RI).

In some aspects, the UE 115-*a* may calculate CSI (e.g., CQI) in a CSI reference resource. For example, in determining the channel quality for each of the slots 215 (e.g., slot 215-*c* through slot 215-*e*), the UE 115-*a* may determine the channel quality in a CSI reference resource including multiple slots. The CSI reference resource may include slot 215-*c* through slot 215-*e*. In some other aspects, the CSI reference resource may include slots other than slot 215-*c* through slot 215-*e*. For example, the CSI reference resource may include some of slot 215-*c* through slot 215-*e* and some of downlink slots such as any of slot 215-*a*, 215-*b*, 215-*f*, and 215-*g*. In some aspects, the CSI reference resource may include a set of slots that at least partially overlaps with slot 215-*c* through slot 215-*e*.

The UE 115-*a* may determine a quantity of slots included in the CSI reference resource and a slot spacing associated with the quantity of slots based on one or more predetermined values. In some aspects, the UE 115-*a* may determine the quantity of slots included in the CSI reference resource and the slot spacing based on a configuration transmitted by the base station 105-*a* via a RRC message or a MAC control element (MAC-CE). The UE 115-*a* may determine the set of slots 215 (e.g., slot 215-*c* through slot 215-*e*, downlink slots other than or including slot 215-*c* through slot 215-*e*) based on the determined quantity of slots and slot spacing.

In some aspects, the UE 115-*a* may determine a location of the CSI reference resource based on a quantity of slots between a last slot 215 (e.g., slot 215-*e*) of the CSI reference resource and an uplink slot 215 (e.g., slot 215-*j*) for transmitting the CSI report. The UE 115-*a* may determine the quantity of slots (i.e., by determining n_ref as described above) between the last slot 215 (e.g., slot 215-*e*) of the CSI reference resource and the uplink slot 215 (e.g., slot 215-*j*) based on a reporting type associated with the CSI report. The reporting type may be, for example, periodic reporting, semi-persistent reporting, or aperiodic reporting. Example aspects of the CSI reference resource and determining channel quality (e.g., CSI, CQI) based on the CSI reference resource are described further herein with reference to FIG. 3.

Base station 105-*a* may determine a set of MCSs for a set of downlink data transmissions (e.g., PDSCH 231-*a* through PDSCH 231-*c*) of a next frame, for example, frame 210 (e.g., a frame n). The set of downlink data transmissions (e.g., PDSCH 231-*a* through PDSCH 231-*c*) may correspond to a set of slots 230 (e.g., slot 230-*d* through slot 230-*f*). In some aspects, base station 105-*a* may determine the set of MCSs based on the CSI report or on criteria other than the CSI report (e.g., based on network implementation). In some aspects, the set of MCSs may include a respective MCS for each downlink data transmission in the set of downlink data transmissions (e.g., a respective MCS for each of PDSCH 231-*a* through PDSCH 231-*c*). In an example, the set of slots (e.g., slot 230-*d* through slot 230-*f*) may be associated with a downlink transmission occasion 204. In some examples, the base station 105-*a* may apply the MCSs four (4) slots after receiving the CSI report 225 (as indicated by 235), for example, which may account for an amount of time for scheduling the set of downlink data transmissions (e.g., PDSCH 231-*a* through PDSCH 231-*c*).

In some aspects, the base station 105-*a* may transmit DCI to the UE 115-*a*. The DCI may indicate the set of MCSs and the set of downlink data transmissions (e.g., PDSCH 231-*a* through PDSCH 231-*c*). Accordingly, the base station 105-*a* may respectively transmit (and the UE 115-*a* may receive and decode) the set of downlink data transmissions (e.g., PDSCH 231-*a* through PDSCH 231-*c*) during the downlink transmission occasion 204 based on the set of MCSs. In some cases, the UE 115-*a* may successfully receive and decode the set of downlink data transmissions (e.g., PDSCH 231-*a* through PDSCH 231-*c*), and in some examples, transmit positive acknowledgements (ACKs) for the set of downlink data transmissions (e.g., PDSCH 231-*a* through PDSCH 231-*c*). For example, the UE 115-*a* may transmit an ACK 240-*a* corresponding to PDSCH 231-*a*, an ACK 240-*b* corresponding to PDSCH 231-*b*, and an ACK 240-*c* corresponding to PDSCH 231-*c* in a physical uplink control channel (PUCCH) 232 included in a slot 230-*h*.

Aspects of the techniques described with reference to FIG. 2 may be advantageous over some systems, for example, by providing MCSs which may account for channel quality variation (and CQI variation) across the set of slots 215 (e.g., slot 215-*c* through slot 215-*e*). In some other systems, for example, a UE may receive an indication of a single slot for providing a channel quality estimation. In some cases, the UE may receive a reference signal (e.g., CSI-RS 220-*a*) from a base station, based on which the UE may provide a channel estimation (e.g., CQI) with respect to a single slot (e.g., slot 215-*c*). In some systems, the UE may provide CSI feedback (e.g., CSI, CQI) to the base station with respect to the single slot (e.g., slot 215-*c*) and the reference signal (e.g., CSI-RS 220-*a*). In some systems, using the CSI feedback, the base station may apply the same MCS (and code rate) for communicating multiple scheduled downlink data transmissions (e.g., PDSCH 231-*a* through PDSCH 231-*c*) to the UE.

However, the CSI feedback provided based on the reference signal (e.g., CSI-RS 220-*a*) for a single slot (e.g., slot 215-*c*) may inaccurately represent channel quality with respect to time (e.g., due to channel variations or channel aging, for example, in high-doppler scenarios). For TDD, for example, HARQ-ACK delay may be relatively large due to limited uplink resources, which may lead to inefficient MCS adjustment by the base station for transmitting signals to the UE. In some systems, applying the same MCS scheme (and code rate) may be applicable for communicating the scheduled downlink data transmissions (e.g., PDSCH 231-*a* through PDSCH 231-*c*) for channel conditions corresponding to the CSI feedback (e.g., channel conditions when the UE measured the quality of the channel), but may not be sufficient for different channel conditions (e.g., relatively poorer channel conditions). In some systems, the UE may be unable to successfully decode all of the scheduled downlink data transmissions (e.g., PDSCH 231-*a* through PDSCH 231-*c*) when using the same MCS scheme. For example, in some systems, the UE may be able to successfully decode a first scheduled downlink data transmission (e.g., the UE may transmit an ACK for PDSCH 231-*a*) encoded using the MCS scheme, but may be unable to successfully decode subsequent scheduled downlink data transmissions (e.g., the UE may transmit negative acknowledgements (NACKs) for PDSCH 231-*b* and PDSCH 231-*c*) encoded using the same MCS scheme. That is, the MCS scheme used by the base station may become outdated, resulting in decreased throughput and spectral efficiency.

According to aspects of techniques described herein, for each of the set of slots 215 (e.g., each of slot 215-*c* through slot 215-*e*) indicated in the configuration received from the base station 105-*a*, the UE 115-*a* may measure a first channel quality (e.g., a wideband CQI) associated with a frequency range (e.g., a wideband) of the set of slots 215 (e.g., slot 215-*c* through slot 215-*e*). In some aspects, the UE 115-*a* may measure one or more second channel qualities (e.g., subband CQIs), each associated with a respective subband of the frequency range. For example, based on a network configuration for wideband CQI, the UE 115-*a* may measure the first channel quality (e.g., a wideband CQI). In another example, based on a network configuration for subband CQI, the UE 115-*a* may measure the first channel quality (e.g., a wideband CQI) and the one or more second channel qualities (e.g., subband CQIs).

In some aspects, for additional slots (e.g., slot 215-*d*, slot 215-*e*), the UE 115-*a* may generate the CSI report (e.g., a CSF report) to include multiple first measured channel qualities (e.g., wideband CQIs) that each correspond to the first channel quality (e.g., a wideband CQI) measured in a respective slot (e.g., slot 215-*c*). In some aspects, for the additional slots (e.g., slot 215-*d*, slot 215-*e*), the UE 115-*a* may generate the CSI report (e.g., a CSF report) to include multiple second measured channel qualities (e.g., subband CQIs) that each correspond to the second channel quality (e.g., subband CQI) measured across a subband of one (e.g., slot 215-*c*) of the set of slots. In some examples, the UE 115-*a* may generate each of the first measured channel qualities (e.g., each of the wideband CQIs for slot 215-*c* through slot 215-*e*) based on a same CRI, a same PMI, and a same RI. In some other examples, the UE 115-*a* may generate each of the second measured channel qualities associated with a same subband (e.g., generate subband CQIs for a same subband for slot 215-*c* through slot 215-*e*) based on a same CRI, a same PMI, and a same RI.

The UE 115-*a* may provide differential reporting (e.g., using delta values) for reporting the measured channel quality for each slot of the set of slots 215 (e.g., each of slot 215-*c* through slot 215-*e*). In some cases, the differential reporting may be self-contained for each slot of the set of slots 215 (e.g., each of slot 215-*c* through slot 215-*e*). For example, measurements within each slot (e.g., slot 215-*c*) may include delta values with respect to another measurement within the same slot, an example of which is described with reference to Table 1. In some other cases, the differential reporting may be self-contained for a first slot (e.g., slot 215-*c*), and the differential reporting for additional slots (e.g., slot 215-*d*, slot 215-*e*) may be with respect to a reference slot (e.g., a first slot, for example, slot 215-*c*). For example, measurements within each additional slot (e.g., slot 215-*d*) may include delta values with respect to a measurement (or measurements) within the reference slot (e.g., the first slot, for example, slot 215-*c*), examples of which are described with reference to Table 2 and Table 3. Referring to the examples in Table 1 through Table 3 and FIG. 2, 'Slot 1' may correspond to slot 215-*c*, and 'Slot 2' may correspond to slot 215-*d* (or slot 215-*e*).

Table 1 below represents an example of a first measured channel quality (e.g., wideband CQI) and second measured channel qualities (e.g., subband CQIs, for example, CQI for subband 1 (SB1) through CQI for subband N (SBN)) for each of Slot 1 and Slot 2. Referring to Table 1, each of the second measured channel qualities (e.g., subband CQIs) for a respective slot may be indicated with a delta value with respect to the first measured channel quality (e.g., wideband CQI) for the respective slot. For example, referring to Slot 1, a second measured channel quality (e.g., CQI for SB1) may be indicated with a delta value (e.g., dCQI1.1) with respect to the first measured channel quality (e.g., CQI1), and another second measured channel quality (e.g., CQI for SB2) may be indicated with a delta value (e.g., dCQI1.2) with respect to the first measured channel quality (e.g., CQI1). In another example, referring to Slot 2, a second measured channel quality (e.g., CQI for SB1) may be indicated with a delta value (e.g., dCQI2.1) with respect to the first measured channel quality (e.g., CQI2), and another second measured channel quality (e.g., CQI for SB2) may be indicated with a delta value (e.g., dCQI2.2) with respect to the first measured channel quality (e.g., CQI2).

TABLE 1

| | Slot 1 | Slot 2 |
|---|---|---|
| wideband CQI | CQI1 | CQI2 |
| CQI for SB1 | CQI1 + dCQI1.1 | CQI2 + dCQI2.1 |
| CQI for SB2 | CQI1 + dCQI1.2 | CQI2 + dCQI2.2 |
| . . . | . . . | . . . |
| CQI for SBN | CQI1 + dCQI1.N | CQI2 + dCQI2.N |

Table 2 below represents an example of a first measured channel quality (e.g., wideband CQI) and second measured channel qualities (e.g., subband CQIs, for example, CQI for SB1 through CQI for SBN) for each of Slot 1 and Slot 2. Referring to Slot 1, the second measured channel qualities (e.g., CQI for SB1 through CQI for SBN) may be indicated with a delta value (e.g., dCQI1.1 through dCQI1.N) with respect to the first measured channel quality (e.g., CQI1). For additional slots (e.g., Slot 2), each of the first measured channel qualities (e.g., wideband CQI) and second measured channel qualities (e.g., subband CQIs) may be indicated with a delta value with respect to the first measured channel quality (e.g., wideband CQI) for the first slot (e.g., Slot 1). For example, for Slot 2, a first measured channel quality (e.g., wideband CQI) may be indicated with a delta value (e.g., dCQI2.0) with respect to the first measured channel quality (e.g., CQI1) for Slot 1. A second measured channel quality (e.g., CQI for SB1) for Slot 2 may be indicated with a delta value (e.g., dCQI2.1) with respect to the first measured channel quality (e.g., CQI1) for Slot 1. Another second measured channel quality (e.g., CQI for SB2) for Slot 2 may be indicated with a delta value (e.g., dCQI2.2) with respect to the first measured channel quality (e.g., CQI1) for Slot 1.

TABLE 2

| | Slot 1 | Slot 2 |
|---|---|---|
| wideband CQI | CQI1 | CQI1 + dCQI2.0 |
| CQI for SB1 | CQI1 + dCQI1.1 | CQI1 + dCQI2.1 |
| CQI for SB2 | CQI1 + dCQI1.2 | CQI1 + dCQI2.2 |
| . . . | . . . | . . . |
| CQI for SB N | CQI1 + dCQI1.N | CQI1 + dCQI2.N |

Table 3 below represents an example of a first measured channel quality (e.g., wideband CQI) and second measured channel qualities (e.g., subband CQIs, for example, CQI for SB1 through CQI for SBN) for each of Slot 1 and Slot 2. Referring to Slot 1, the second measured channel qualities (e.g., CQI for SB1 through CQI for SBN) may be indicated with a delta value (e.g., dCQI1.1 through dCQI1.N) with respect to the first measured channel quality (e.g., CQI1).

For additional slots (e.g., Slot 2), each of the first measured channel qualities (e.g., wideband CQI) and second measured channel qualities (e.g., subband CQIs) may be indicated with a delta value with respect to a corresponding first measured channel quality (e.g., wideband CQI) or second measured channel quality (e.g., subband CQI) for the first slot (e.g., Slot 1). For example, for Slot 2, a first measured channel quality (e.g., wideband CQI) may be indicated with a delta value (e.g., dCQI2.0) with respect to the first measured channel quality (e.g., CQI1) for Slot 1. A second measured channel quality (e.g., CQI for SB1) for Slot 2 may be indicated with a delta value (e.g., dCQI2.1) with respect to the first measured channel quality (e.g., CQI1) or the second measured channel quality (e.g., CQI1+dCQI1.1) for Slot 1. Another second measured channel quality (e.g., CQI for SB2) for Slot 2 may be indicated with a delta value (e.g., dCQI2.2) with respect to the first measured channel quality (e.g., CQI1) or the second measured channel quality (e.g., CQI1+dCQI1.2) for Slot 1. In some aspects, using differential reporting (e.g., using delta values) for reporting the measured channel quality may provide advantages such as reduced data usage and increased throughput.

TABLE 3

| | Slot 1 | Slot 2 |
|---|---|---|
| wideband CQI | CQI1 | CQI1 + dCQI2.0 |
| CQI for SB1 | CQI1 + dCQI1.1 | CQI1 + dCQI1.1 + dCQI2.1 |
| CQI for SB2 | CQI1 + dCQI1.2 | CQI1 + dCQI1.2 + dCQI2.2 |
| . . . | . . . | . . . |
| CQI for SB N | CQI1 + dCQI1.N | CQI1 + dCQI1.N + dCQI2.N |

In an example of differential reporting with reference to FIG. 2, the CSI report generated by the UE 115-*a* may include respective measured channel qualities (e.g., wideband CQIs, subband CQIs) for the set of slots 215 (e.g., slot 215-*c* through slot 215-*e*). For example, the CSI report may include a measured channel quality (e.g., CQI1) for the slot 215-*c*, a measured channel quality (e.g., CQI2=CQI1+dCQI1) for the slot 215-*d*, and a measured channel quality (e.g., CQI3=CQI2+dCQI2) for the slot 215-*e*. In some aspects, the base station 105-*a* may determine the set of MCSs for scheduled downlink data transmissions (e.g., PDSCH 231-*a* through PDSCH 231-*c*) of the next frame (e.g., frame 210) based on the differential reporting (e.g., based on the delta values) or on criteria other than the differential reporting (e.g., based on network implementation). In an example, the base station 105-*a* may determine an MCS1 for PDSCH 231-*a* based on CQI1, an MCS2 for PDSCH 231-*b* based on dCQI1, and an MCS3 for PDSCH 231-*c* based on dCQI2.

Figure 3:
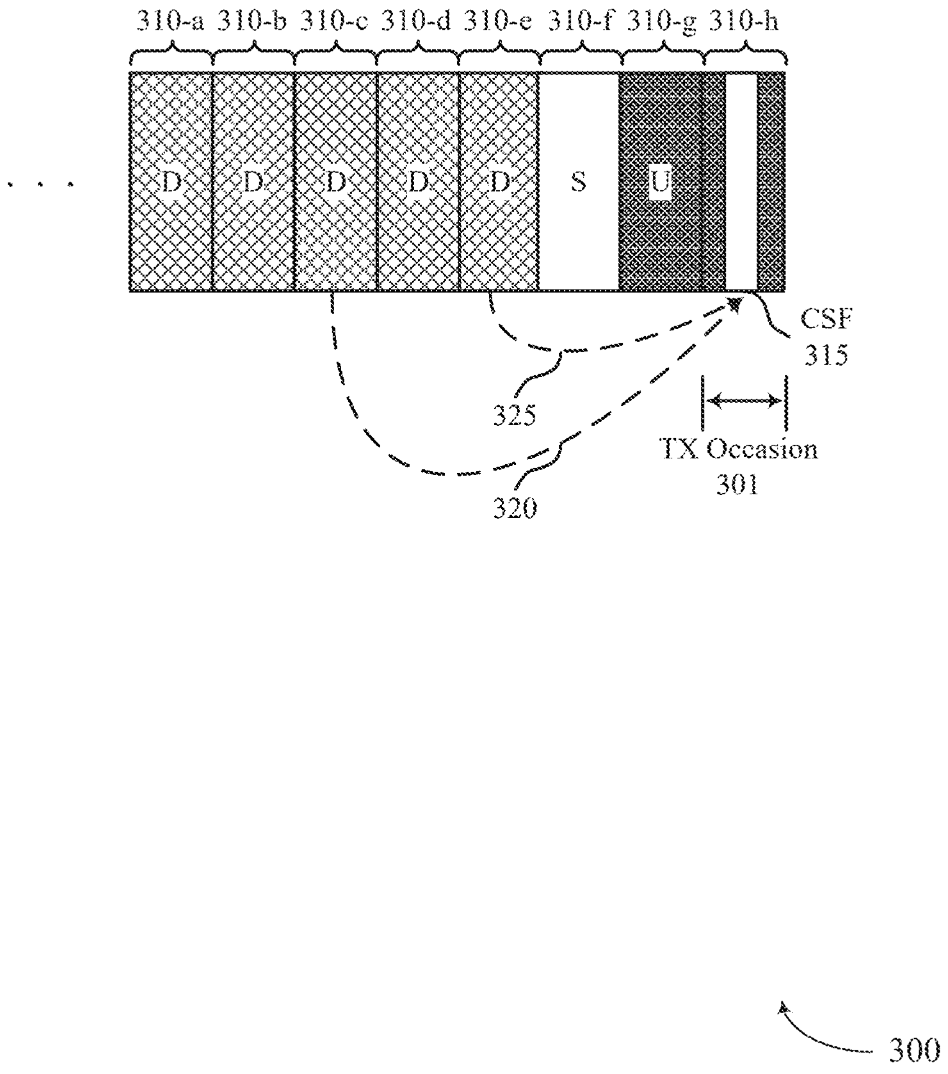
FIG. 3 illustrates an example of a configuration that supports multi-slot CQI reporting in accordance with aspects of the present disclosure.

FIG. 3 illustrates an example of a configuration 300 that supports multi-slot CQI reporting in accordance with aspects of the present disclosure. In some examples, the configuration 300 may be implemented by aspects of wireless communications systems 100 or 200. The configuration 300 may be an example of the configuration described with reference to the frame 205 of FIG. 2. The configuration 300 may include slots 310 (e.g., slot 310-*a* through slot 310-*h*), which may be examples of some of slots 215 (e.g., slot 215-*c* through slot 215-*j*) described with reference to FIG. 2. In the example configuration 300, slot 310-*a* through slot 310-*e* are downlink slots, slot 310-*f* is a special slot (e.g., a slot including 14 symbols and a guard period), and slot 310-*g* and slot 310-*h* are uplink slots.

In reference to FIG. 2 and FIG. 3, the configuration 300 may indicate a CSI reference resource for the set of slots 310 (e.g., a combination of slot 310-*a* through slot 310-*e*, for example, slot 310-*a* through slot 310-*c* or slot 310-*c* through slot 310-*e*). Slot 310-*a* may be referred to as a slot n−7, and slot 310-*h* may be referred to as a slot n. In an example, in the time domain, the CSI reference resource may include multiple slots ending at a slot 310 (e.g., any of slots 310-*b* through 310-*e*) that is a quantity of slots prior to the slot 310-*h* for the CSI report carrying a multi-slot CQI. In some aspects, the quantity of slots prior to the slot 310-*h* may be indicated to the UE 115-*a* using a parameter n_CSI_ref (also referred to herein as n_ref).

The CSI reference resource may be an artificial or virtual slot in which CQI may be calculated. The location of the CSI reference resource may be defined using an offset relative to a slot for CSI reporting (e.g., slot 310-*h* of uplink transmission occasion 301, during which the UE 115-*a* may transmit CSF 315). The CSI reference resource may differ from CSI-RS resources as described herein, as CSI-RS resources may refer to physical resources over which CSI-RSs may be transmitted. For example, configuration of CSI-RS resources may include a quantity of ports and resource mapping of the ports (e.g., code division multiplexing (CDM) type, resource element and symbol location in each resource block, CSI-RS density, etc.). The CSI reference resource may or may not overlap with actual transmitted CSI-RSs.

In an example, the UE 115-*a* may determine the quantity of slots 310 (e.g., a combination of slots 310-*a* through 310-*e*) included in the CSI reference resource and a slot spacing associated with the quantity of slots based on one or more predetermined values. In some other aspects, the UE 115-*a* may determine the quantity of slots 310 (e.g., a combination of slots 310-*a* through 310-*e*) included in the CSI reference resource and the slot spacing based on a configuration transmitted by the base station 105-*a* via a RRC message or a MAC-CE. The UE 115-*a* may determine a location of the CSI reference resource based on a quantity of slots between a last slot 310 (e.g., slot 310-*c*, slot 310-*e*) of the CSI reference resource and an uplink slot 310 (e.g., slot 310-*h*) for transmitting the CSI report. The UE 115-*a* may determine the quantity of slots between the last slot 310 (e.g., slot 310-*c*, slot 310-*e*) of the CSI reference resource and the uplink slot 310 (e.g., slot 310-*h*) based on a reporting type associated with the CSI report. The reporting type may be, for example, periodic reporting, semi-persistent reporting, or aperiodic reporting.

In an example of periodic reporting or semi-persistent reporting, the UE 115-*a* may transmit a CSI report to the base station 105-*a* with one or more CSI-RS resources and a subcarrier spacing of 15 kHz. In the example of periodic reporting or semi-persistent reporting, the parameter n_CSI_ref may be equal to a quantity of five (5) slots, and the CSI reference resource may be associated with slot 310-*a* (e.g., slot n−7) through slot 310-*c* (e.g., slot n−5). That is, the CSI reference resource may end at slot 310-*c*. Slot 310-*c* may be the last slot included in the transmitted CSI report, as indicated by 320. In an example of aperiodic reporting, the UE 115-*a* may transmit a CSI report to the base station 105-*a* with a 4-port (or greater) Type I/II CSI report and a subcarrier spacing of 15 kHz. In an example aperiodic reporting, the parameter n_CSI_ref may be equal to a quantity of three (3) slots, and the CSI reference resource may be associated with slot 310-*c* (e.g., slot n−5) through slot 310-*e* (e.g., slot n−3). For example, the UE 115-*a* may utilize rules for determining Z' as described above. In an example, the CSI may be a type II CSI with 32 ports, with SCS=15 kHz, and thus Z2' of low timeline table may be refrained from being used and Z2'=37. Note here, floor (37/14)=two (2), but since n−2 is not a valid downlink slot, n_CSI_ref (also referred to herein as n_ref) should be three (3). n_ref is the smallest integer greater than or equal to floor (37/14) such that the CSI reference slot is a valid downlink slot. In some aspects, the CSI reference resource may end at slot 310-*e*. Slot 310-*e* may be the last slot included in the transmitted CSI report, as indicated by 325.

In some aspects, the slot spacing for a set of slots 310 (e.g., any of slot 310-*a* through slot 310-*e* for multi-slot CQI reporting) may be equal to a quantity of zero slots. For example, the set of slots 310 (e.g., slot 310-*a* through slot 310-*c*, slot 310-*c* through slot 310-*e*) may be consecutive (e.g., in the time domain). In some other aspects, the slot spacing for the set of slots 310 (e.g., any of slot 310-*a* through slot 310-*e* for multi-slot CQI reporting) may be equal to a quantity of one or more slots. For example, the set of slots 310 (e.g., slot 310-*a*, slot 310-*c*, and slot 310-*e*) may be non-consecutive (e.g., in the time domain).

In some cases, the UE 115-*a* may identify, from a CSI reference resource including multiple slots, an invalid slot for CQI calculation. For example, the UE 115-*a* may identify that a slot of the nominal CSI reference slots (e.g., a slot for multi-slot CQI reporting as determined by the quantity of slots and slot spacing) is an invalid slot based on slot type (e.g., downlink slot, uplink slot). In some aspects, the UE 115-*a* may refrain from measuring the channel quality for the identified invalid slot (e.g., slot 310-*d*). The UE 115-*a* may identify a valid slot (e.g., slot 310-*c*) based on slot type (e.g., downlink slot, uplink slot) that precedes or follows the identified invalid slot, and in some examples, measure the channel quality for the identified valid slot (e.g., slot 310-*c*).

For example, a slot format (e.g., for ten (10) slots, slots 1 through 10) may be DDDUUDDDSU, and nominal slots for CSI reference slots (e.g., nominal slots for a multi-slot CSI reference resource) may include slots 2, 4, and 6. In an example, UE 115-*a* may determine that slot 4 is an invalid slot (e.g., not a downlink slot). The UE 115-*a* may identify slot 3 as a valid slot (e.g., a downlink slot that precedes or follows the invalid slot). The UE 115-*a* may select, as the slots for multi-slot CQI reporting, slots 2, 3, and 6 (e.g., measuring and reporting CQI for slot 3 instead of slot 4).

In some examples, the UE 115-*a* may determine CQI for each slot of multiple slots of a CSI reference resource assuming a same slot format for each slot of the multiple slots. For example, the UE 115-*a* may measure the channel quality for each of the set of slots 310 (e.g., any combination of slot 310-*a* through slot 310-*e*, for example, slot 310-*a* through slot 310-*c* or slot 310-*c* through slot 310-*e*) based on a same slot format (e.g., in terms of downlink signals in the slots). In some examples, for the CSI reference resource, the slot format for each slot of the set of slots 310 may include any combination of a quantity of OFDM symbols occupied by control signaling, a combined quantity of PDSCH symbols and demodulation reference signal (DMRS) symbols, a bandwidth configured for CQI reporting, a ratio of PDSCH energy per resource element (EPRE) to CSI-RS EPRE, a quantity of DMRS symbols, an assumption that the PDSCH symbols do not include a DMRS, a physical resource block (PRB) bundling size equal to two PRBs for DMRS and PDSCH, and a PMI.

Figure 4A:
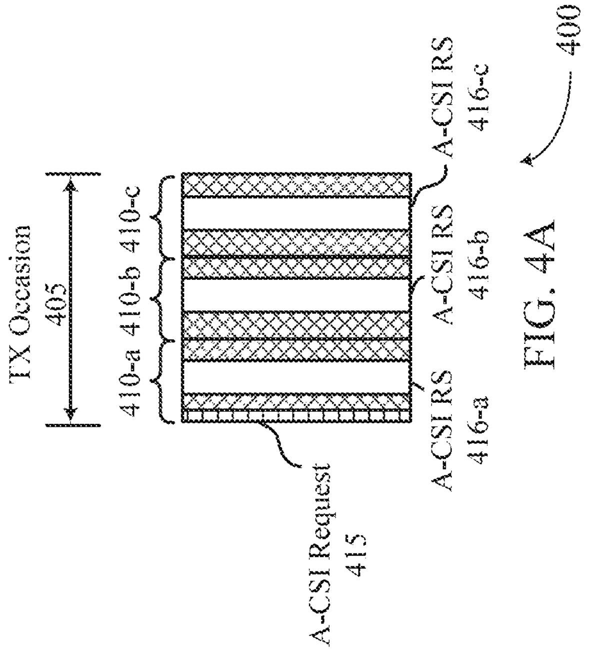
FIGS. 4A and 4B illustrate example transmissions that support multi-slot CQI reporting in accordance with aspects of the present disclosure.
Figure 4B:
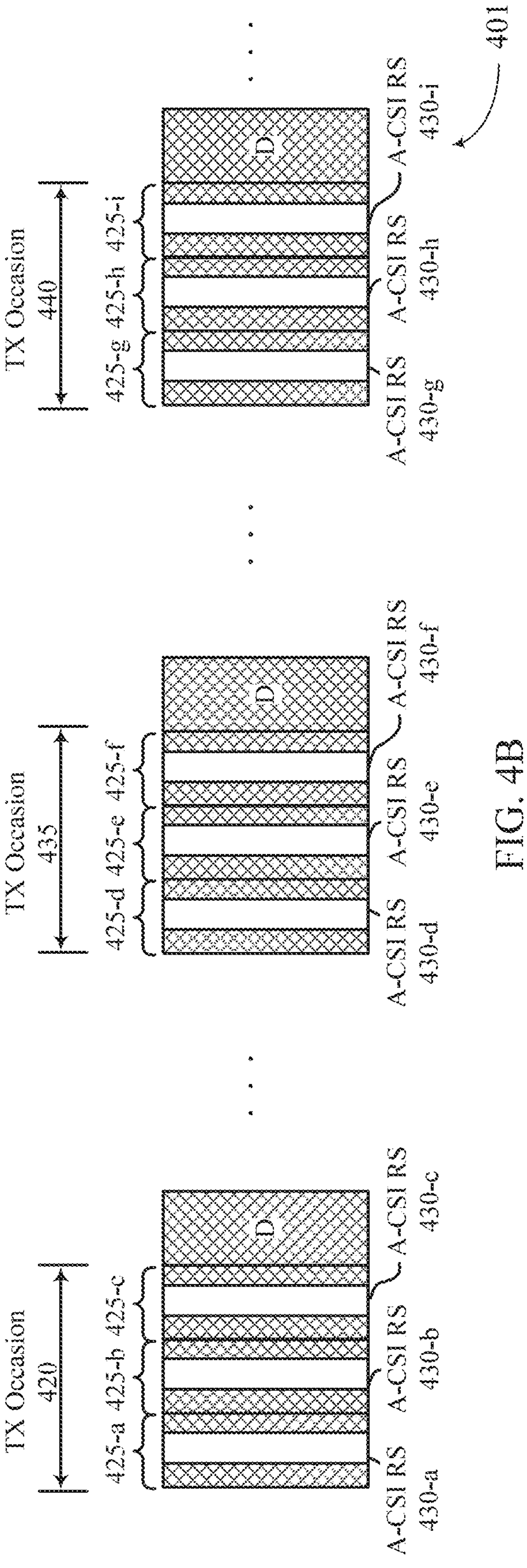

FIGS. 4A and 4B illustrate example transmissions 400 and 401 that support multi-slot CQI reporting in accordance with aspects of the present disclosure. In some examples, the transmissions 400 and 401 may be implemented by aspects of wireless communications systems 100 or 200. The transmissions 400 and 401 may be examples of the multi-shot transmissions by the base station 105-*a* described with reference to FIG. 2. According to examples of aspects described herein, the base station 105-*a* may transmit a set (or cluster) of reference signals (e.g., CSI-RSs) based on an aperiodic reporting type (e.g., aperiodic CSI (A-CSI) based on periodic, semi-persistent, and aperiodic CSI-RS resources), a periodic reporting type (e.g., periodic CSI based on periodic CSI-RS resources), or a semi-persistent reporting type (e.g., semi-persistent CSI based on periodic and semi-persistent CSI-RS resources).

In some aspects of the aperiodic configuration (aperiodic reporting type, aperiodic CSI-RS resources), the UE 115-*a* may receive a multi-shot transmission for each of one or more CSI-RS resources over a set of slots, where each shot of the multi-shot transmission may be transmitted by the base station 105-*a* in one slot of the set of slots. For example, the base station 105-*a* may transmit CSI-RS resources in K slots (e.g., three (3) slots) during each transmission occasion 405 (e.g., downlink transmission occasion). In some aspects, K may be a slot quantity and may be equal to an integer value. In some other aspects, the K slots may have a slot spacing of M slots (where M may be an integer value) between a slot of the K slots and another slot of the K slots. In an example of aperiodic CSI-RS resources, the base station 105-*a* may transmit CSI-RS resources in a slot n, a slot n+M, a slot n+2M, . . . and a slot n+(K−1)*M. The base station 105-*a* may transmit a configuration indicating the slot quantity (e.g., K) and the slot spacing (e.g., M) via an RRC message or a MAC-CE.

In an example of the aperiodic configuration (aperiodic reporting type, aperiodic CSI-RS resources) described with reference to FIG. 4A, the base station 105-*a* may transmit (and the UE 115-*a* may receive) a transmission 400 of aperiodic CSI-RS resources in a set of slots (e.g., slot 410-*a* through slot 410-*c*) during transmission occasion 405. Slot 410-*a* may be a slot n, slot 410-*b* may be a slot n+1, and slot 410-*c* may be a slot n+2. In an example, the UE 115-*a* may receive A CSI-RS 416-*a* through A CSI-RS 416-*c* in slot 410-*a* through slot 410-*c*, respectively. In some aspects, the base station 105-*a* may transmit an A-CSI request 415 to the UE 115-*a* over CSI-RS resources of slot 410-*a*. The UE 115-*a* may generate and transmit a CSI report to the base station 105-*a* based on the A-CSI request 415. The A-CSI request 415 may be referred to as a CSI reporting trigger.

In some aspects of a periodic or semi-persistent configuration (periodic or semi-persistent reporting type, periodic or semi-persistent CSI-RS resources), the UE 115-*a* may receive a multi-shot transmission for each of the one or more CSI-RS resources over the set of slots, for each transmission occasion of each of the periodic or semi-persistent CSI-RS resources. Each shot of the multi-shot transmission may be transmitted by the base station 105-*a* in one slot of the set of slots. For example, the base station 105-*a* may transmit a set of CSI-RS resources multiple times (e.g., once for each of multiple transmission occasions). For example, the base station 105-*a* may transmit the set of CSI-RS resources during each of transmission occasion 420, transmission occasion 435, and transmission occasion 440. Each of transmission occasion 420, transmission occasion 435, and transmission occasion 440 may be a downlink transmission occasion. For example, the base station 105-*a* may transmit each of a set of CSI-RS resources in K slots (e.g., three (3) slots) associated with each of transmission occasion 420, transmission occasion 435, and transmission occasion 440.

In some aspects, the K slots may have a slot spacing of M slots between a slot of the K slots and another slot of the K slots. In an example of periodic or semi-persistent CSI-RS resources, for an s-th transmission occasion having a periodicity T, the base station 105-*a* may transmit CSI-RS resources in a slot n+(s−1)*T, a slot n+(s−1)*T+M, a slot n+(s−1)*T+2M, . . . , and a slot n+(s−1)*T+(K−1)*M. In some examples, aspects of wireless communications systems 100 or 200 may support multi-slot CQI reporting for cases of a low periodicity (e.g., a periodicity of four (4) or more slots but less than ten (10) slots). The base station 105-*a* may transmit a configuration indicating the slot quantity (e.g., K) and the slot spacing (e.g., M) via an RRC message or a MAC-CE.

In an example of a periodic or semi-persistent configuration described with reference to FIG. 4B, the base station 105-*a* may transmit (and the UE 115-*a* may receive) a first multi-shot transmission of periodic or semi-persistent CSI-RS resources in a set of slots (e.g., slot 425-*a* through slot 425-*c*) during the transmission occasion 420. Slot 425-*a* may be a slot n, slot 425-*b* may be a slot n+1, and slot 425-*c* may be a slot n+2. In an example, the UE 115-*a* may receive A CSI-RS 430-*a* through A CSI-RS 430-*c* in slot 425-*a* through slot 425-*c*, respectively. The base station 105-*a* may transmit (and the UE 115-*a* may receive) a second multi-shot transmission of periodic or semi-persistent CSI-RS resources in a set of slots (e.g., slot 425-*d* through slot 425-*f*) during the transmission occasion 435. Slot 425-*d* may be a slot n+9, slot 425-*e* may be a slot n+10, and slot 425-*f* may be a slot n+2. In an example, the UE 115-*a* may receive A CSI-RS 430-*d* through A CSI-RS 430-*f* in slot 425-*d* through slot 425-*f*, respectively.

The base station 105-*a* may transmit (and the UE 115-*a* may receive) a third multi-shot transmission of periodic or semi-persistent CSI-RS resources in a set of slots (e.g., slot 425-*g* through slot 425-*i*) during the transmission occasion 440. Slot 425-*g* may be a slot n+19, slot 425-*h* may be a slot n+20, and slot 425-*i* may be a slot n+21. In an example, the UE 115-*a* may receive A CSI-RS 430-*g* through A CSI-RS 430-*i* in slot 425-*g* through slot 425-*i*, respectively. Transmission occasion 420 through transmission occasion 440 may be a transmission occasion 0 through a transmission occasion 2, respectively.

In some aspects, the base station 105-*a* may transmit a single-shot CSI-RS transmission with repetition “ON”. In some systems, repetition “ON” may be used for beam management. The network may configure a CSI report configuration with report quantity “none,” and this report linked to a resource set with repetition “ON.” In repetition “ON,” each resource may be transmitted by the base station 105-*a* with same spatial transmission filter (e.g., same spatial beam). A UE 115 may receive each resource using a different receive beam, and determine the best receive beam for the spatial transmission filter which is commonly used across the repeated resources. Accordingly, since the process is for receive beam determination, the UE 115 may refrain from reporting anything. In some aspects, the base station 105-*a* may transmit each of the CSI-RS resources in a corresponding slot.

In some aspects, for multi-slot CQI reporting, for a single-shot CSI-RS transmission with repetition “ON,” there may be no CRI report as all resources may be a repetition of each other. For example, based on the CRI, the UE 115-*a* may identify (e.g., assume) that the base station 105-*a* has transmitted the same CSI-RS resource via repetition, for example, multiple times (e.g., eight (8) times) over multiple slots. Based on the assumption by the UE 115-*a* and the transmission of the same CSI-RS resource via repetition, the UE 115-*a* may provide multi-slot CQI reporting as described herein.

For example, for cases of multiple resources in some other systems, a UE may report a CRI indicating that the UE has selected one of the multiple resources for CSI calculation. According to examples of aspects described herein, the UE 115-*a* may assume transmission of the same CSI-RS resource via repetition, in which multiple CSI-RS resources are actually the same CSI-RS resource (e.g., transmitting with the same implementation by the base station 105-*a*). Accordingly, the UE 115-*a* may refrain from reporting CRI, and the UE 115-*a* may use the CSI-RS resources to compute multi-slot CQI, as the CSI-RS resources are transmitted in different slots.

Figure 5:
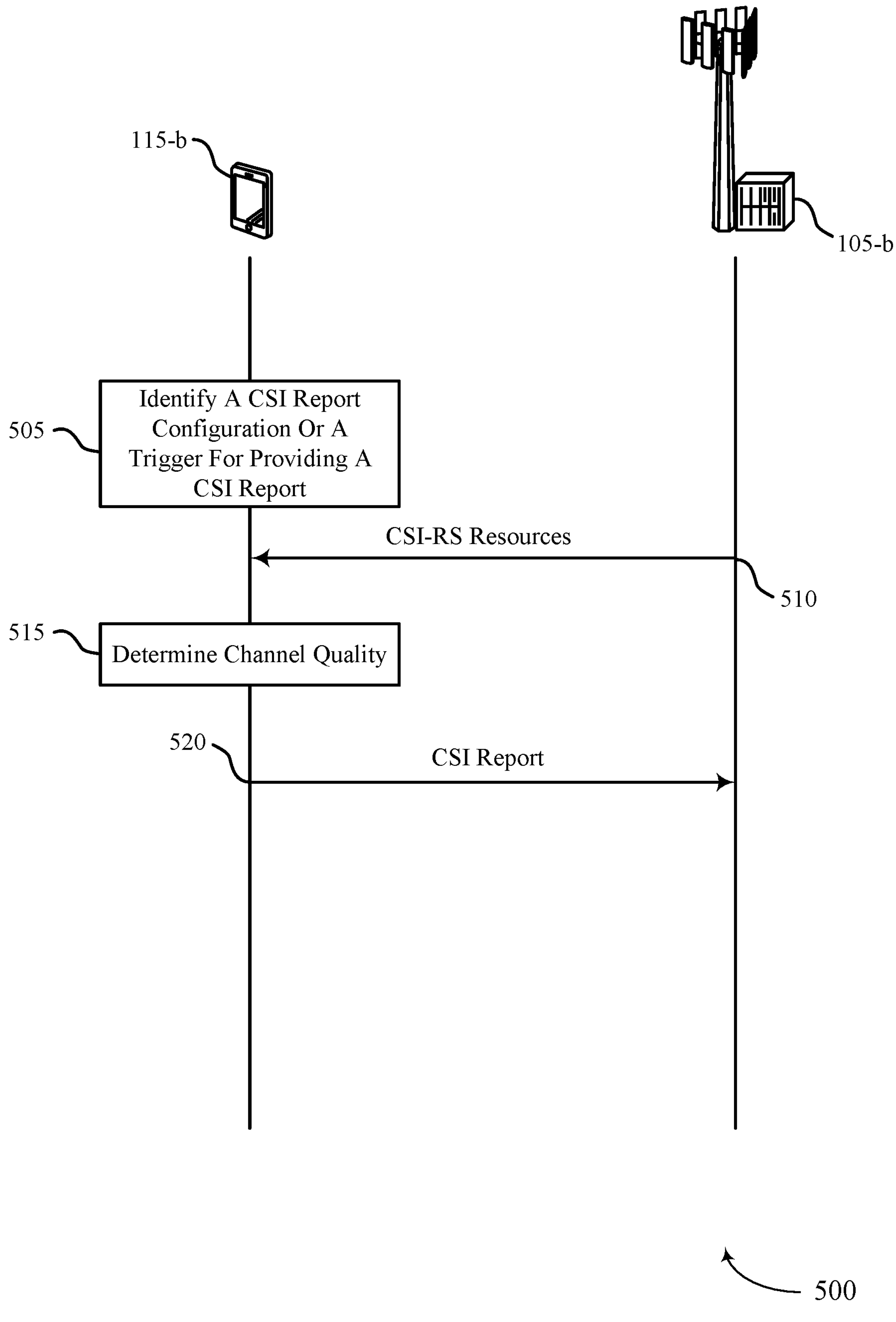
FIG. 5 illustrates an example of a process flow that supports multi-slot CQI reporting in accordance with aspects of the present disclosure.

FIG. 5 illustrates an example of a process flow 500 that supports multi-slot CQI reporting in accordance with aspects of the present disclosure. In some examples, process flow 500 may implement aspects of wireless communications systems 100 or 200. Process flow 500 may be implemented by a UE 115-*b* and a base station 105-*b*, which may be examples of a UE 115 and a base station 105 described with reference to FIG. 1 and a UE 115-*a* and a base station 105-*a* described with reference to FIG. 1.

In the following description of the process flow 500, the operations between UE 115-*b* and base station 105-*b* may be transmitted in a different order than the order shown, or the operations performed by base station 105-*b* and UE 115-*b* may be performed in different orders or at different times. Certain operations may also be left out of the process flow 500, or other operations may be added to the process flow 500. It is to be understood that while base station 105-*b* and UE 115-*b* are shown performing a number of the operations of process flow 500, any wireless device may perform the operations shown.

At 505, UE 115-*b* may identify a CSI report configuration or a trigger for providing a CSI report. In an example, the UE 115-*a* may receive the CSI report configuration or the trigger for providing the CSI report from the base station 105-*a*.

At 510, the UE 115-*b* may receive one or more CSI-RS resources associated with the CSI report.

At 515, the UE 115-*b* may determine, based on a measurement of one or more CSI reference signals, a channel quality for each slot of a set of slots. For example, UE 115-*b* may measure, for each slot of the set of slots, a first channel quality (e.g., a wideband CQI) associated with a frequency range of the set of slots. In some aspects, UE 115-*b* may measure, for each slot of the set of slots, one or more second channel qualities (e.g., subband CQIs), each associated with a respective subband of the frequency range. In some example aspects of determining the channel quality for each slot of the set of slots, the UE 115-*b* may determine the channel quality in a CSI reference resource comprising multiple slots. The UE 115-*b* may determine a quantity of slots included in the CSI reference resource and a slot spacing associated with the quantity of slots based on one or more predetermined values or on a configuration transmitted by the base station 105-*b* via a RRC message or a MAC-CE.

In some aspects, at 515, the UE 115-*b* may determine a multi-shot CSI-RS transmission or a multi-slot CSI reference resource and then perform CSI measurement or calculation based on the determination. For example, in determining the channel quality for each slot of the set of slots, the UE 115-*b* may determine the channel quality in a CSI reference resource comprising multiple slots. In some aspects, the UE 115-*b* may determine a location of the CSI reference resource based a quantity of slots between a last slot of the CSI reference resource and an uplink slot for transmitting the CSI report. In some examples, the UE 115-*b* may determine the quantity of slots between the last slot of the CSI reference resource and the uplink slot based on a reporting type associated with the CSI report, where the reporting type comprises periodic reporting, semi-persistent reporting, or aperiodic reporting. In some examples, the UE 115-*b* may determine a quantity of slots included in the CSI reference resource and a slot spacing associated with the quantity of slots based on one or more predetermined values or on a configuration transmitted by the base station 105-*b* via a RRC message or a MAC-CE.

At 520, UE 115-*b* may transmit, during an uplink transmission occasion, the CSI report that includes the channel quality for two or more slots of the set of slots. In some aspects, UE 115-*b* may generate (and report) the CSI report to include at least one of a plurality of first measured channel qualities (e.g., a wideband CQIs) that each correspond to the first channel quality measured in a respective slot and a plurality of second measured channel qualities (e.g., subband CQIs) that each correspond to a second channel quality measured across a subband of one of the set of slots.

Figure 6:
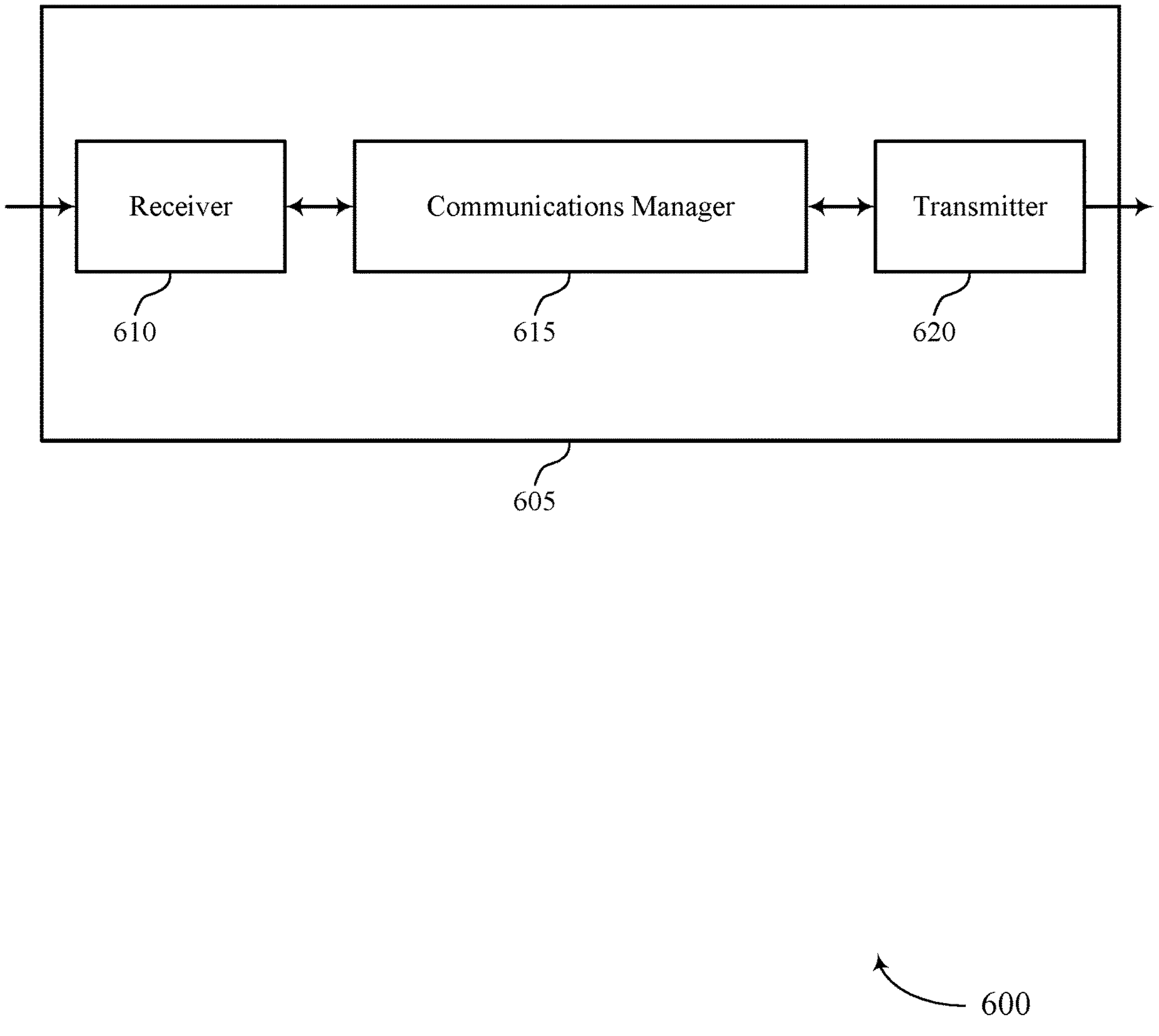
FIGS. 6 and 7 show block diagrams of devices that support multi-slot CQI reporting in accordance with aspects of the present disclosure.

FIG. 6 shows a block diagram 600 of a device 605 that supports multi-slot CQI reporting in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to multi-slot CQI reporting, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a CSI report configuration or a trigger for reporting a CSI report, transmit, during an uplink transmission occasion, the CSI report that includes the channel quality for two or more slots of the set of slots, receive one or more CSI-RS resources associated with the CSI report, and determine, based on a measurement of one or more CSI-RSs, a channel quality for each slot of a set of slots. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
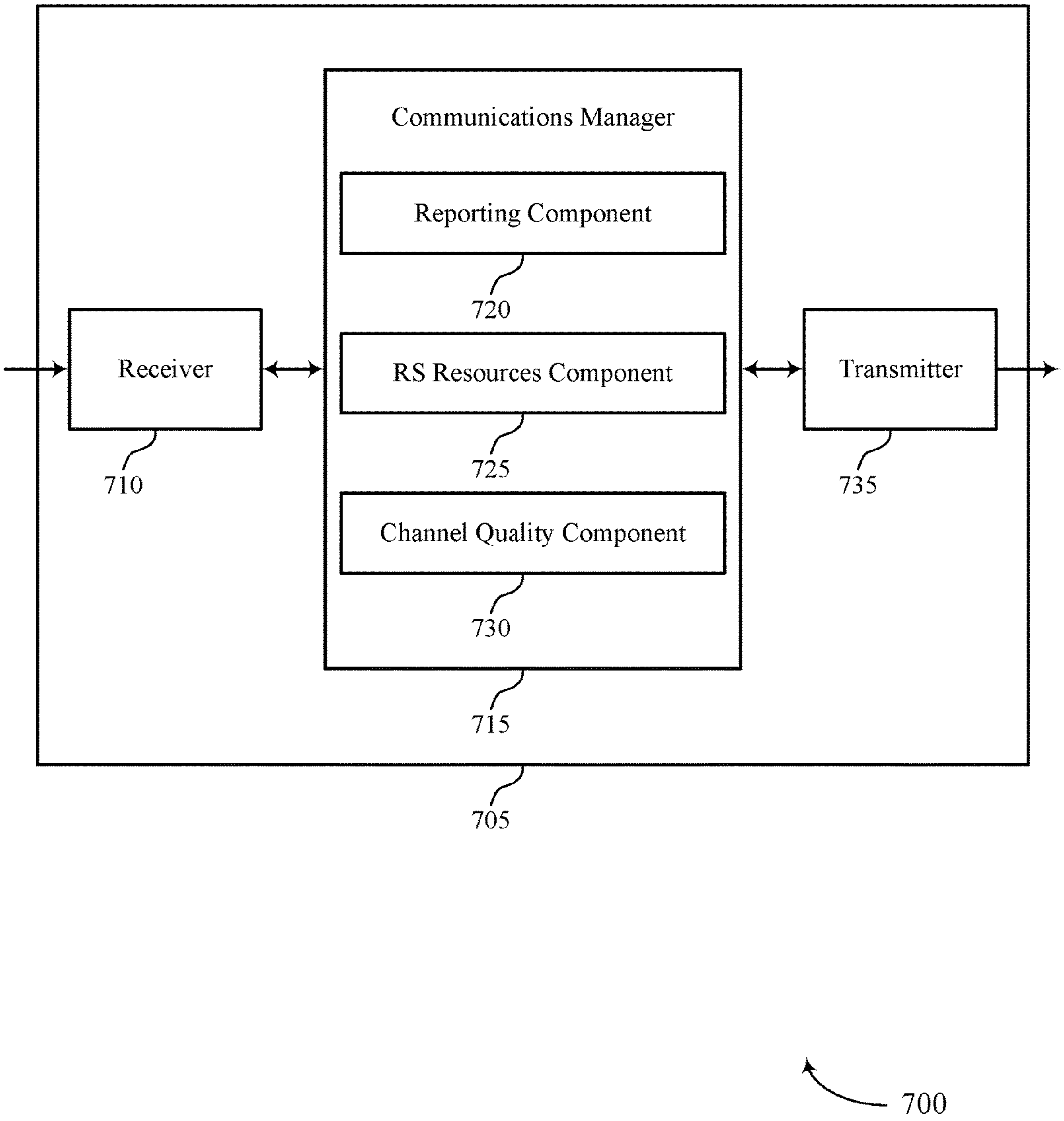

FIG. 7 shows a block diagram 700 of a device 705 that supports multi-slot CQI reporting in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to multi-slot CQI reporting, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a reporting component 720, a RS resources component 725, and a channel quality component 730. The communications manager 715 may be an example of aspects of the communications manager 910 described herein.

The reporting component 720 may identify a CSI report configuration or a trigger for reporting a CSI report and transmit, during an uplink transmission occasion, the CSI report that includes the channel quality for two or more slots of the set of slots.

The RS resources component 725 may receive one or more CSI-RS resources associated with the CSI report.

The channel quality component 730 may determine, based on a measurement of one or more CSI-RSs, a channel quality for each slot of a set of slots.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
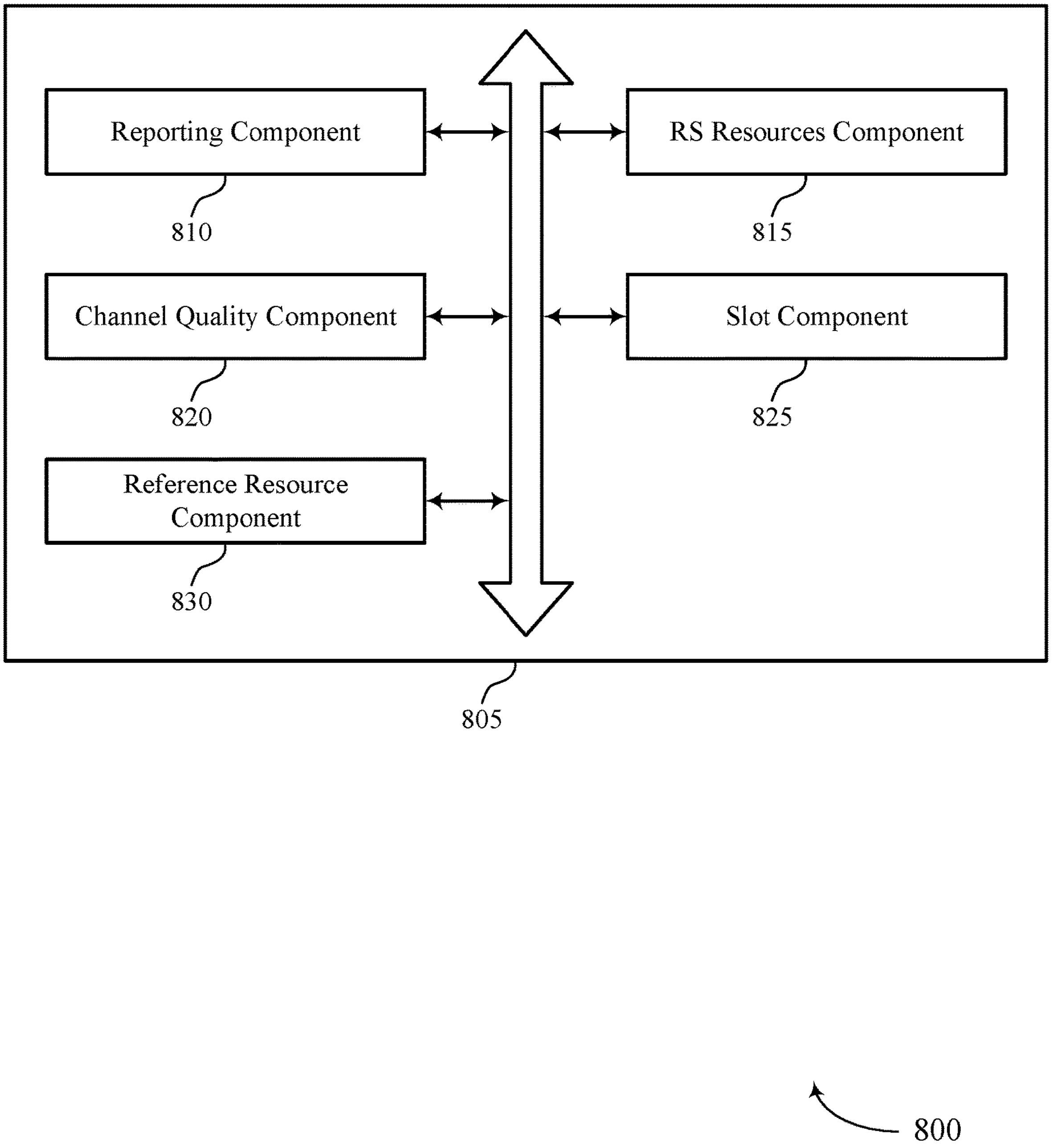
FIG. 8 shows a block diagram of a communications manager that supports multi-slot CQI reporting in accordance with aspects of the present disclosure.

FIG. 8 shows a block diagram 800 of a communications manager 805 that supports multi-slot CQI reporting in accordance with aspects of the present disclosure. The communications manager 805 may be an example of aspects of a communications manager 615, a communications manager 715, or a communications manager 910 described herein. The communications manager 805 may include a reporting component 810, a RS resources component 815, a channel quality component 820, a slot component 825, and a reference resource component 830. Each of these modules may communicate, directly or indirectly, with one another (e.g., via one or more buses).

The reporting component 810 may identify a CSI report configuration or a trigger for reporting a CSI report.

In some examples, the reporting component 810 may transmit, during an uplink transmission occasion, the CSI report that includes the channel quality for two or more slots of the set of slots.

In some examples, the reporting component 810 may generate and reporting the CSI report to include at least one of a set of first measured channel qualities that each correspond to the first channel quality measured in a respective slot and a set of second measured channel qualities that each correspond to a second channel quality measured across a subband of the respective slot.

In some examples, the reporting component 810 may include, in the CSI report, a first measured channel quality for each slot of the set of slots, and a set of second measured channel qualities for each slot of the set of slots, where each of the second measured channel qualities for a respective slot is indicated with a delta value with respect to the first measured channel quality for the respective slot.

In some examples, the reporting component 810 may include, in the CSI report, a first measured channel quality for a first slot of the set of slots, first measured channel qualities for additional slots of the set of slots, and a set of second measured channel qualities for each of the set of slots, where each of the first measured channel qualities for the additional slots and each of the set of second measured channel qualities is indicated with a delta value with respect to the first measured channel quality for the first slot.

In some examples, the reporting component 810 may include, in the CSI report, a first measured channel quality for a first slot of the set of slots, first measured channel qualities for additional slots of the set of slots, a set of second measured channel qualities for the first slot, and a set of second measured channel qualities for the additional slots, where each of the set of second measured channel qualities for the first slot are indicated with a delta value with respect to the first measured channel quality for the first slot, and where each of the first measured channel qualities for the additional slots and the set of second measured channel qualities for the additional slots is indicated with a delta value with respect to a corresponding first measured channel quality or second measured channel quality for the first slot.

The RS resources component 815 may receive one or more CSI-RS resources associated with the CSI report.

In some examples, receiving a configuration indicating that the one or more CSI-RS resources are transmitted via repetition, where the transmission via repetition includes that the one or more CSI-RS resources are transmitted using a same spatial transmission filter.

In some cases, the one or more CSI-RS resources are aperiodic CSI-RS resources.

In some cases, the method further including receiving a multi-shot transmission for each of the one or more CSI-RS resources over a second set of slots at least partially overlapping the set of slots, where each shot of the multi-shot transmission is transmitted in one slot of the set of slots.

In some cases, the one or more CSI-RS resources are periodic or semi-persistent CSI-RS resources.

In some cases, the method further including, for each transmission occasion of each of the periodic or semi-persistent CSI-RS resources, receiving a multi-shot transmission for each of the one or more CSI-RS resources over a second set of slots at least partially overlapping the set of slots, where each shot of the multi-shot transmission is transmitted in one slot of the second set of slots.

In some cases, each of the one or more CSI-RS resources is transmitted in a slot of a second set of slots at least partially overlapping the set of slots.

The channel quality component 820 may determine, based on a measurement of one or more CSI-RSs, a channel quality for each slot of a set of slots.

In some examples, the channel quality component 820 may measure, for each slot of the set of slots, a first channel quality associated with a frequency range of the set of slots.

In some examples, the channel quality component 820 may measure, for each slot of the set of slots, one or more second channel qualities, each associated with a respective subband of the frequency range.

In some examples, the channel quality component 820 may generate each of the set of first measured channel qualities based on a same CRI, a same PMI, and a same RI.

In some examples, the channel quality component 820 may generate each of the set of second measured channel qualities associated with a same subband based on a same CRI, a same PMI, and a same RI.

In some examples, determining the channel quality for each slot of the set of slots includes determining the channel quality in a CSI reference resource including multiple slots.

In some examples, determining CQI for each slot of the multiple slots of the CSI reference resource assuming a same slot format for each slot of the multiple slots, where the slot format includes at least one or more of a quantity of OFDM symbols for a physical downlink control channel (PDCCH), a quantity of OFDM symbols for PDSCH symbols and DMRS symbols, a frequency bandwidth configured for CQI calculation, a ratio of PDSCH energy per resource element (EPRE) to CSI-RS EPRE, a quantity of DMRS symbols, an assumption that the PDSCH symbols do not comprise a DMRS, a physical resource block (PRB) bundling size equal to two PRBs for DMRS symbols and PDSCH symbols, and a PMI In some examples, the channel quality component 820 may refrain from determining the channel quality during the identified invalid slot.

In some examples, the channel quality component 820 may measure the channel quality for the identified valid slot.

In some examples, determining the channel quality for each slot of the second set of slots includes determining multi-slot CQI over the second set of slots, where determining the multi-slot CQI includes determining CQI for each slot of the second set of slots.

In some cases, the CSI report configuration includes a multi-slot CQI configuration.

The slot component 825 may determine a quantity of slots included in the CSI reference resource and a slot spacing associated with the quantity of slots based on one or more predetermined values or on a configuration transmitted by a base station via a RRC message or a MAC-CE.

In some examples, the slot component 825 may determine the set of slots based on the determining the quantity of slots and the slot spacing.

In some examples, determining the quantity of slots between the last slot of the CSI reference resource and the uplink slot based on a reporting type associated with the CSI report, where the reporting type includes periodic reporting, semi-persistent reporting, or aperiodic reporting.

In some examples, the slot component 825 may identify, from a CSI reference resource including multiple slots, an invalid slot for CQI calculation.

In some examples, the slot component 825 may identify a valid slot, where the identified valid slot precedes or follows the identified invalid slot.

In some examples, the slot component 825 may receive the one or more CSI-RSs over a second set of slots at least partially overlapping the set of slots.

In some cases, the slot spacing is equal to a quantity of zero slots between a slot of the set of slots and another slot of the set of slots.

In some cases, the slot spacing is equal to a quantity of one or more slots between a slot of the set of slots and another slot of the set of slots.

In some cases, a quantity of shots of the multi-shot transmission and a slot spacing of the multi-shot transmission is configured by a network via a RRC message or a MAC-CE.

The reference resource component 830 may determine a location of the CSI reference resource based on a quantity of slots between a last slot of the CSI reference resource and an uplink slot for transmitting the CSI report.

Figure 9:
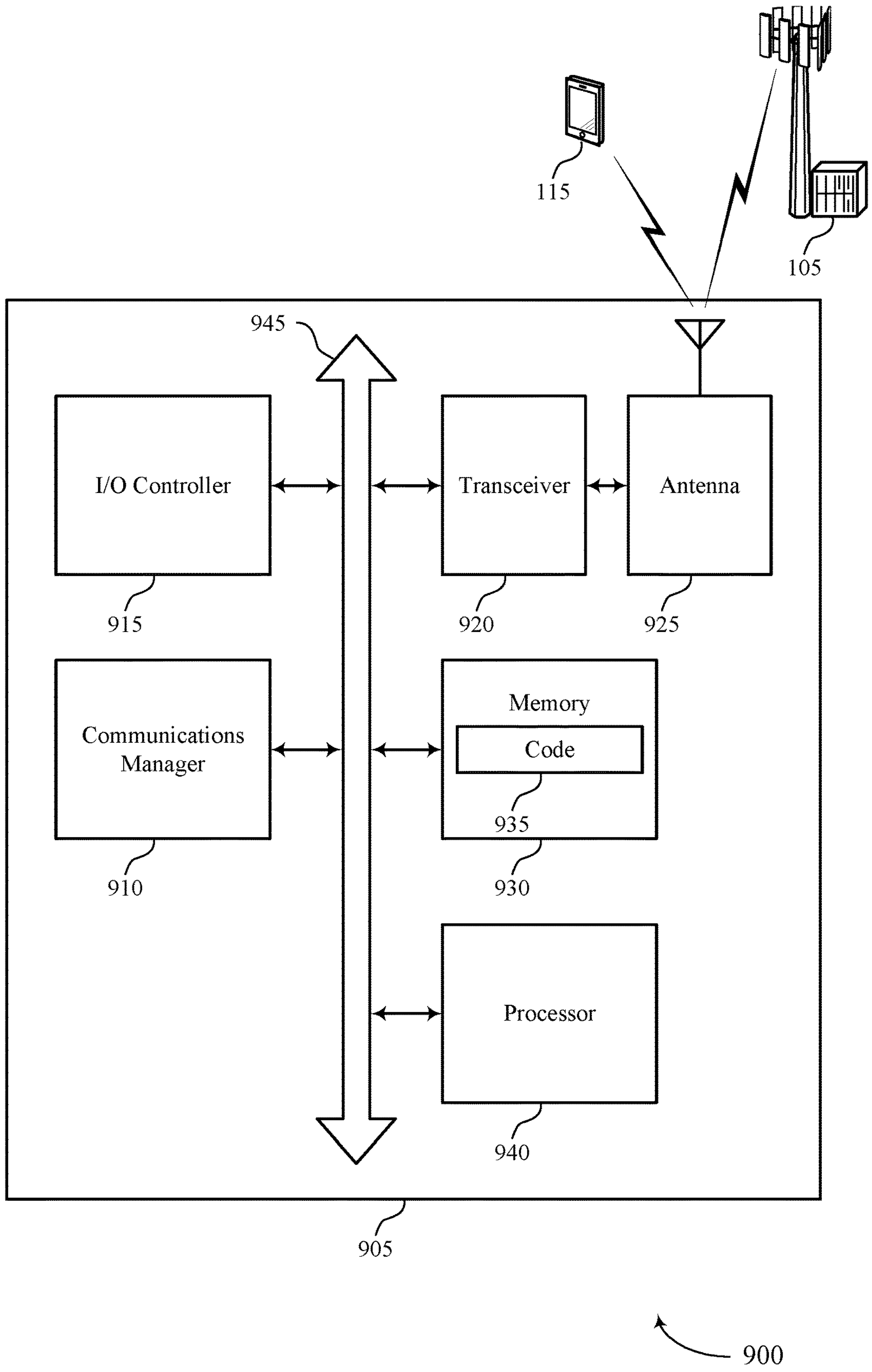
FIG. 9 shows a diagram of a system including a device that supports multi-slot CQI reporting in accordance with aspects of the present disclosure.

FIG. 9 shows a diagram of a system 900 including a device 905 that supports multi-slot CQI reporting in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a CSI report configuration or a trigger for reporting a CSI report, transmit, during an uplink transmission occasion, the CSI report that includes the channel quality for two or more slots of the set of slots, receive one or more CSI-RS resources associated with the CSI report, and determine, based on a measurement of one or more CSI-RSs, a channel quality for each slot of a set of slots.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as OS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting multi-slot CQI reporting).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
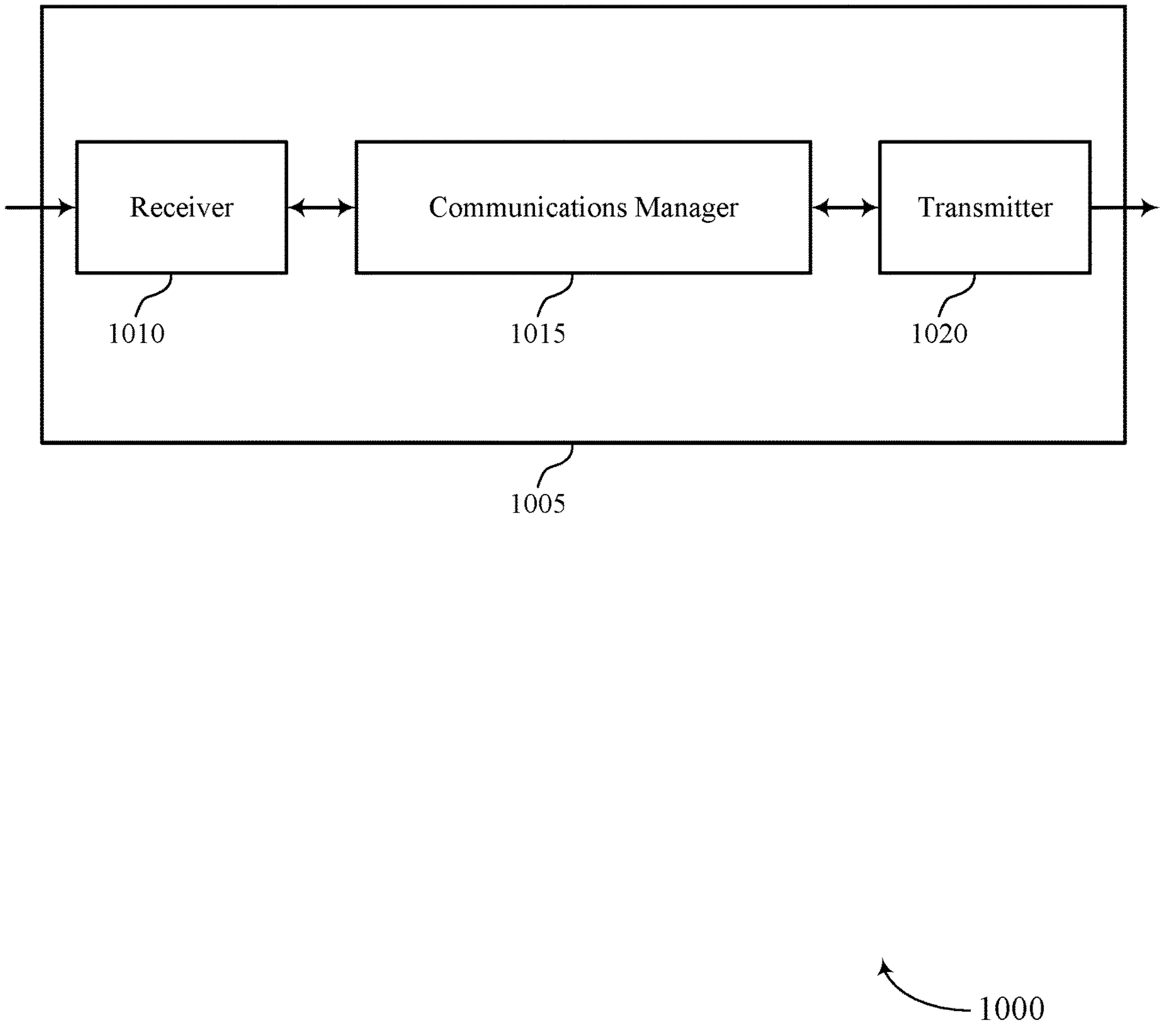
FIGS. 10 and 11 show block diagrams of devices that support multi-slot CQI reporting in accordance with aspects of the present disclosure.

FIG. 10 shows a block diagram 1000 of a device 1005 that supports multi-slot CQI reporting in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to multi-slot CQI reporting, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a CSI report configuration or a trigger for reporting a CSI report, receive, during an uplink transmission occasion, the CSI report that includes a measured channel quality for two or more slots of a set of slots, and transmit one or more CSI-RS resources associated with the CSI report. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
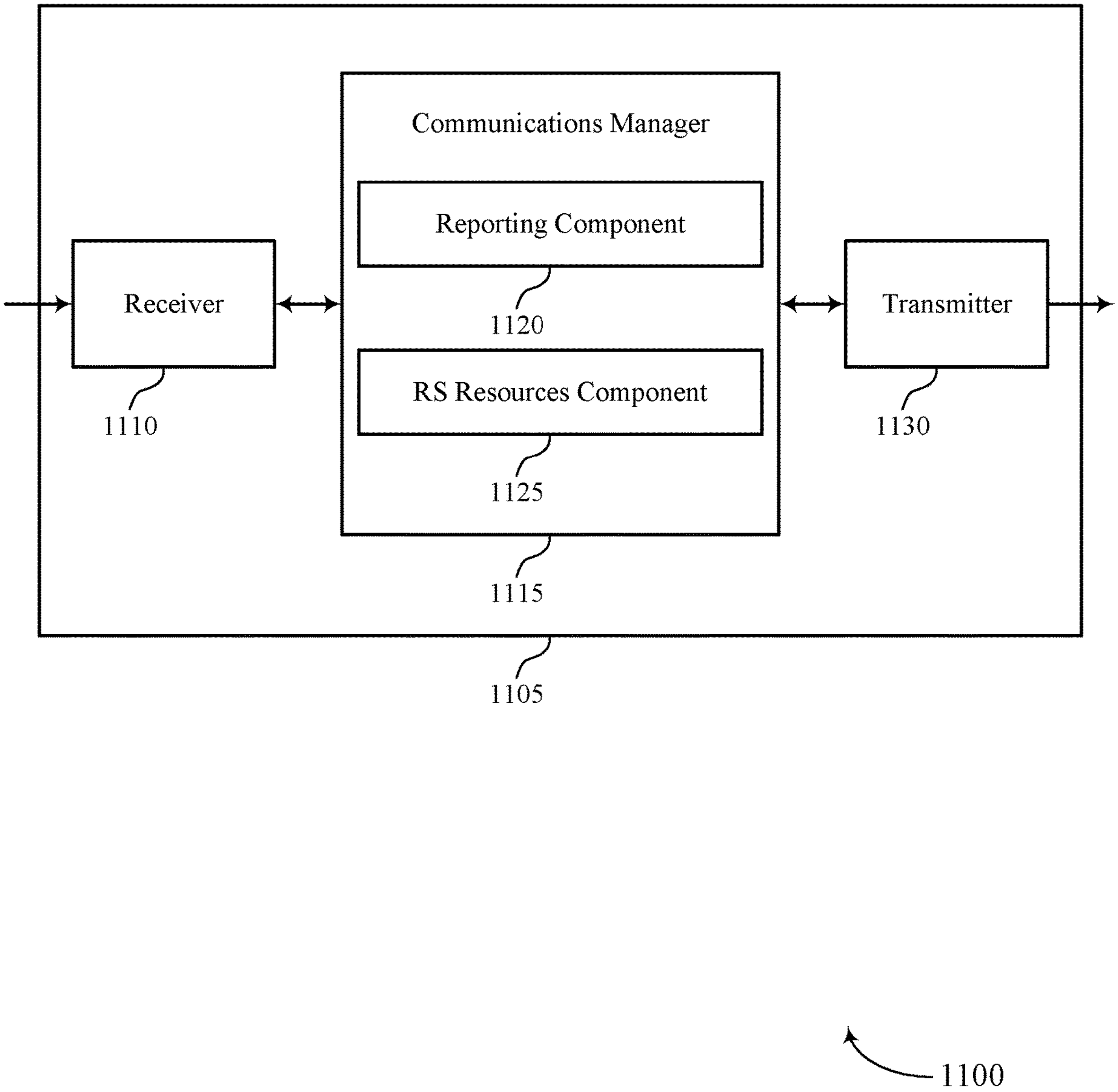

FIG. 11 shows a block diagram 1100 of a device 1105 that supports multi-slot CQI reporting in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to multi-slot CQI reporting, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a reporting component 1120 and a RS resources component 1125. The communications manager 1115 may be an example of aspects of the communications manager 1310 described herein.

The reporting component 1120 may transmit a CSI report configuration or a trigger for reporting a CSI report and receive, during an uplink transmission occasion, the CSI report that includes a measured channel quality for two or more slots of a set of slots.

The RS resources component 1125 may transmit one or more CSI-RS resources associated with the CSI report.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
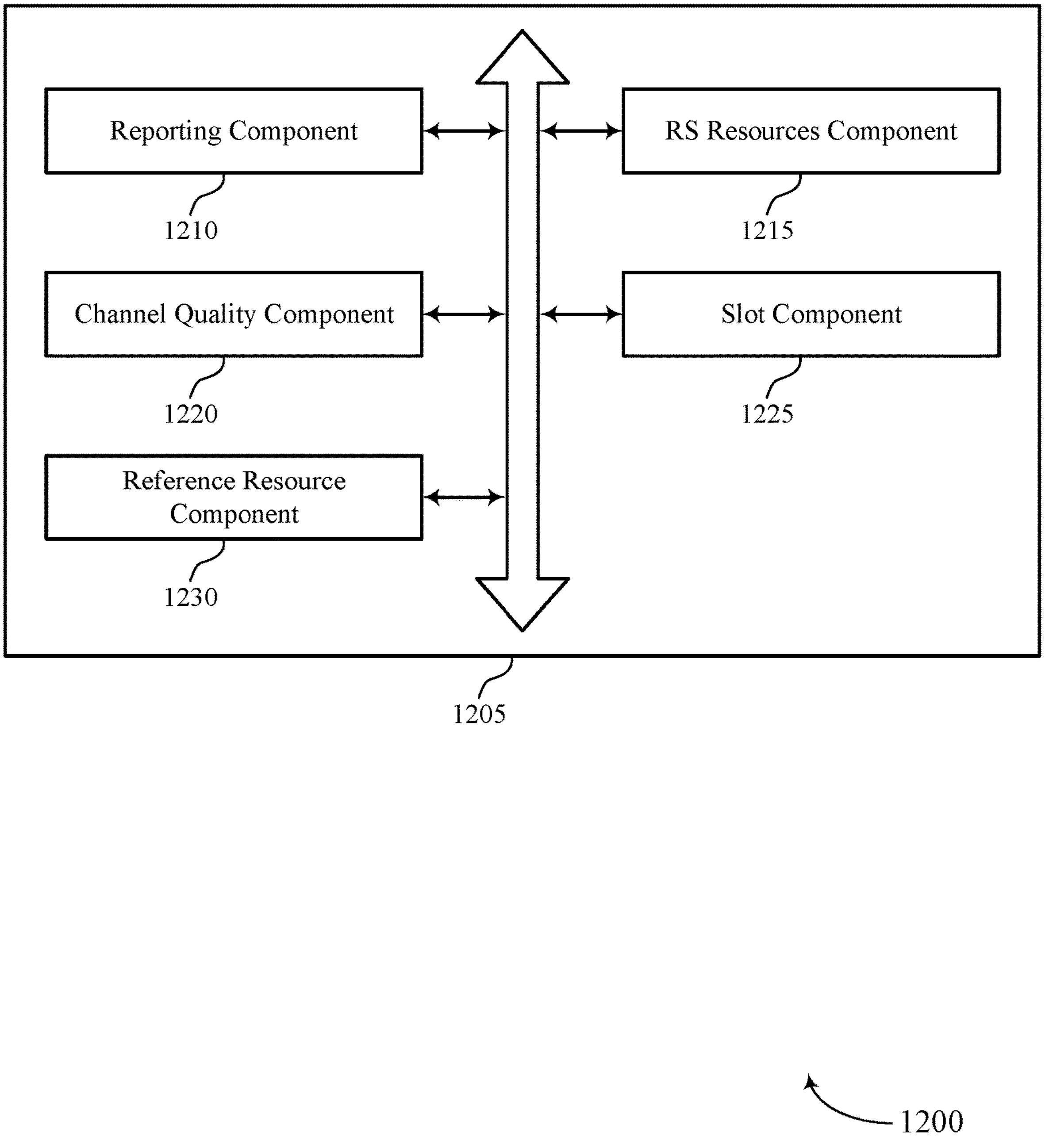
FIG. 12 shows a block diagram of a communications manager that supports multi-slot CQI reporting in accordance with aspects of the present disclosure.

FIG. 12 shows a block diagram 1200 of a communications manager 1205 that supports multi-slot CQI reporting in accordance with aspects of the present disclosure. The communications manager 1205 may be an example of aspects of a communications manager 1015, a communications manager 1115, or a communications manager 1310 described herein. The communications manager 1205 may include a reporting component 1210, a RS resources component 1215, a channel quality component 1220, a slot component 1225, and a reference resource component 1230.

Each of these modules may communicate, directly or indirectly, with one another (e.g., via one or more buses).

The reporting component 1210 may transmit a CSI report configuration or a trigger for reporting a CSI report.

In some examples, the reporting component 1210 may receive, during an uplink transmission occasion, the CSI report that includes a measured channel quality for two or more slots of a set of slots.

In some examples, transmitting an indication of a reporting type associated with the CSI report, where the reporting type includes periodic reporting, semi-persistent reporting, or aperiodic reporting.

In some cases, a set of first measured channel qualities that each correspond to the first channel quality measured in a respective slot and a set of second measured channel qualities that each correspond to a second channel quality measured across a subband of the respective slot.

In some cases, a first measured channel quality for each slot of the two or more slots, and a set of second measured channel qualities for each slot of the two or more slots, where each of the second measured channel qualities for a respective slot is indicated with a delta value with respect to the first measured channel quality for the respective slot.

In some cases, a first measured channel quality for a first slot of the two or more slots, first measured channel qualities for additional slots of the two or more slots, and a set of second measured channel qualities for each of the two or more slots, where each of the first measured channel qualities for the additional slots and each of the set of second measured channel qualities is indicated with a delta value with respect to the first measured channel quality for the first slot.

In some cases, a first measured channel quality for a first slot of the two or more slots, first measured channel qualities for additional slots of the two or more slots, a set of second measured channel qualities for the first slot, and a set of second measured channel qualities for the additional slots, where each of the set of second measured channel qualities for the first slot are indicated with a delta value with respect to the first measured channel quality for the first slot, and where each of the first measured channel qualities for the additional slots and the set of second measured channel qualities for the additional slots is indicated with a delta value with respect to a corresponding first measured channel quality or second measured channel quality for the first slot.

In some cases, the CSI report configuration includes a multi-slot CQI configuration.

The RS resources component 1215 may transmit one or more CSI-RS resources associated with the CSI report.

In some examples, transmitting the one or more CSI-RS resources via repetition, where transmitting via the repetition includes transmitting the one or more CSI-RS resources using a same spatial transmission filter.

In some examples, the RS resources component 1215 may transmit each of the one or more CSI-RS resources in a slot of a second set of slots at least partially overlapping the set of slots.

In some cases, the one or more CSI-RS resources are aperiodic CSI-RS resources.

In some cases, the method further including transmitting a multi-shot transmission for each of the one or more CSI-RS resources over a second set of slots at least partially overlapping the set of slots, where the transmitting includes transmitting each shot of the multi-shot transmission in one slot of the set of slots.

In some cases, the one or more CSI-RS resources are periodic or semi-persistent CSI-RS resources.

In some cases, the method further including, for each transmission occasion of each of the periodic or semi-persistent CSI-RS resources, transmitting a multi-shot transmission for each of the one or more CSI-RS resources over a second set of slots at least partially overlapping the set of slots, where the transmitting includes transmitting each shot of the multi-shot transmission in one slot of the second set of slots.

In some cases, the method further including transmitting a configuration indicating that the one or more CSI-RS resources are transmitted via repetition.

The channel quality component 1220 may identify, for each slot of the two or more slots, a measured first channel quality associated with a frequency range of the two or more slots.

In some examples, the channel quality component 1220 may identify, for each slot of the two or more slots, one or more measured second channel qualities, each associated with a respective subband of the frequency range.

In some examples, receiving CQI for each slot of the multiple slots of the CSI reference resource, where the CQI for each slot is determined assuming a same slot format for each slot of the multiple slots, where the slot format includes at least one or more of a quantity of OFDM symbols for a PDCCH, a quantity of OFDM symbols for PDSCH symbols and DMRS symbols, a frequency bandwidth configured for CQI calculation, a ratio of PDSCH energy per resource element (EPRE) to CSI-RS EPRE, a quantity of DMRS symbols, an assumption that the PDSCH symbols do not comprise a DMRS, a physical resource block (PRB) bundling size equal to two PRBs for DMRS symbols and PDSCH symbols, and a PMI.

In some examples, the measured channel quality for the two or more slots of the second set of slots includes multi-slot CQI determined over the second set of slots, the multi-slot CQI including CQI determined for each slot of the second set of slots.

In some cases, each of the set of first measured channel qualities is based on a same CRI, a same PMI, and a same RI.

In some cases, each of the set of second measured channel qualities associated with a same subband is based on a same CRI, a same PMI, and a same RI.

In some cases, the measured channel quality for each slot of the two or more slots is measured in a CSI reference resource including multiple slots.

The slot component 1225 may transmit a configuration indicating a quantity of slots included the CSI reference resource and a slot spacing associated with the quantity of slots via a RRC message or a MAC-CE.

In some examples, the slot component 1225 may determine the set of slots based on one or more predetermined values or on the configuration indicating the quantity of slots and the slot spacing.

In some examples, the slot component 1225 may determine the quantity of slots between the last slot of the CSI reference resource and the uplink slot based on the reporting type.

In some examples, the slot component 1225 may transmit the one or more CSI-RSs over a second set of slots at least partially overlapping the set of slots.

In some cases, the slot spacing is equal to a quantity of zero slots between a slot of the set of slots and another slot of the set of slots.

In some cases, the slot spacing is equal to a quantity of one or more slots between a slot of the set of slots and another slot of the set of slots.

In some cases, a quantity of shots of the multi-shot transmission and a slot spacing of the multi-shot transmission is configured by a network via a RRC message or a MAC-CE.

The reference resource component 1230 may determine a location of the CSI reference resource based on a quantity of slots between a last slot of the CSI reference resource and an uplink slot for transmitting the CSI report.

Figure 13:
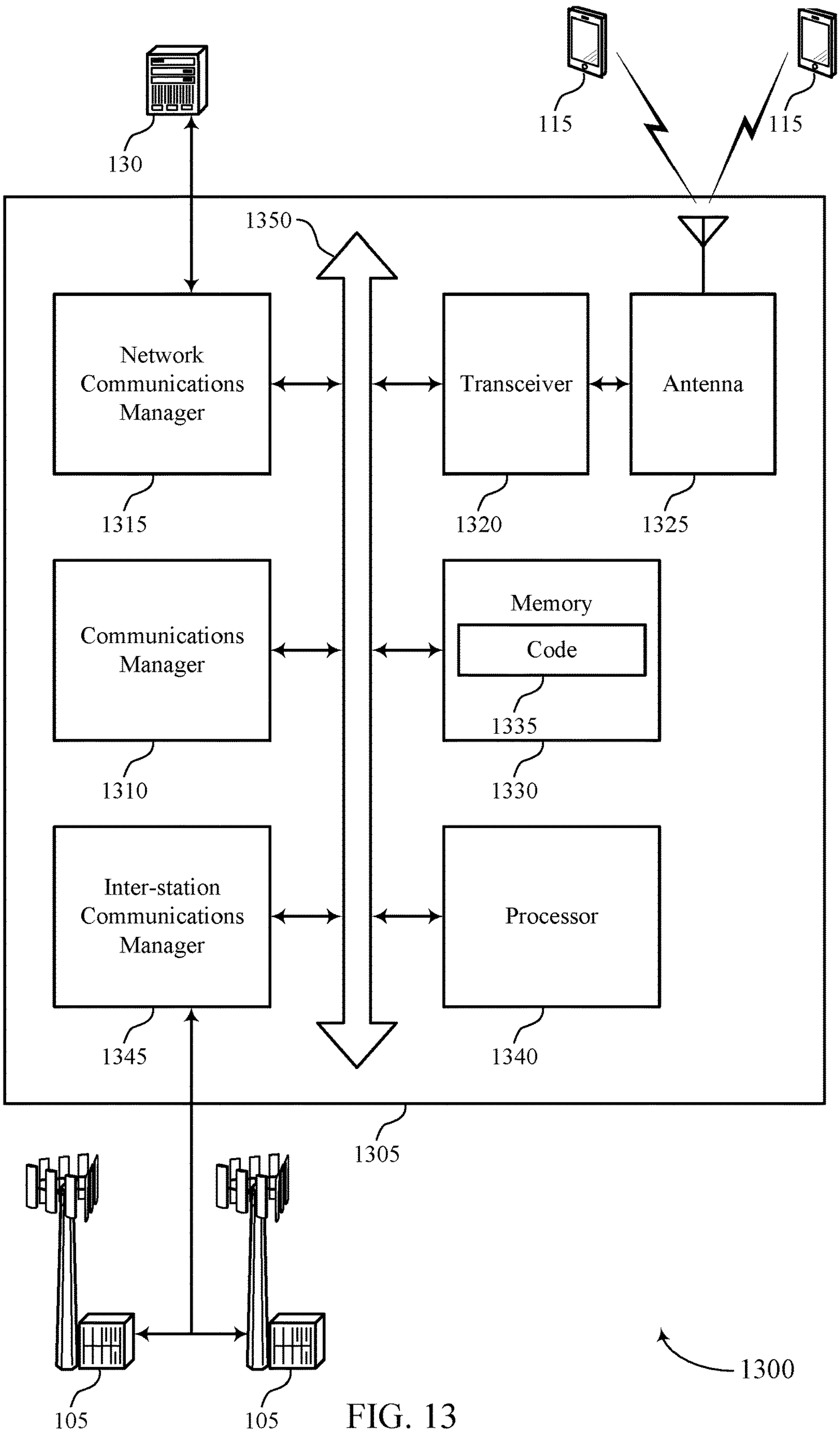
FIG. 13 shows a diagram of a system including a device that supports multi-slot CQI reporting in accordance with aspects of the present disclosure.

FIG. 13 shows a diagram of a system 1300 including a device 1305 that supports multi-slot CQI reporting in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit a CSI report configuration or a trigger for reporting a CSI report, receive, during an uplink transmission occasion, the CSI report that includes a measured channel quality for two or more slots of a set of slots, and transmit one or more CSI-RS resources associated with the CSI report.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting multi-slot CQI reporting).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
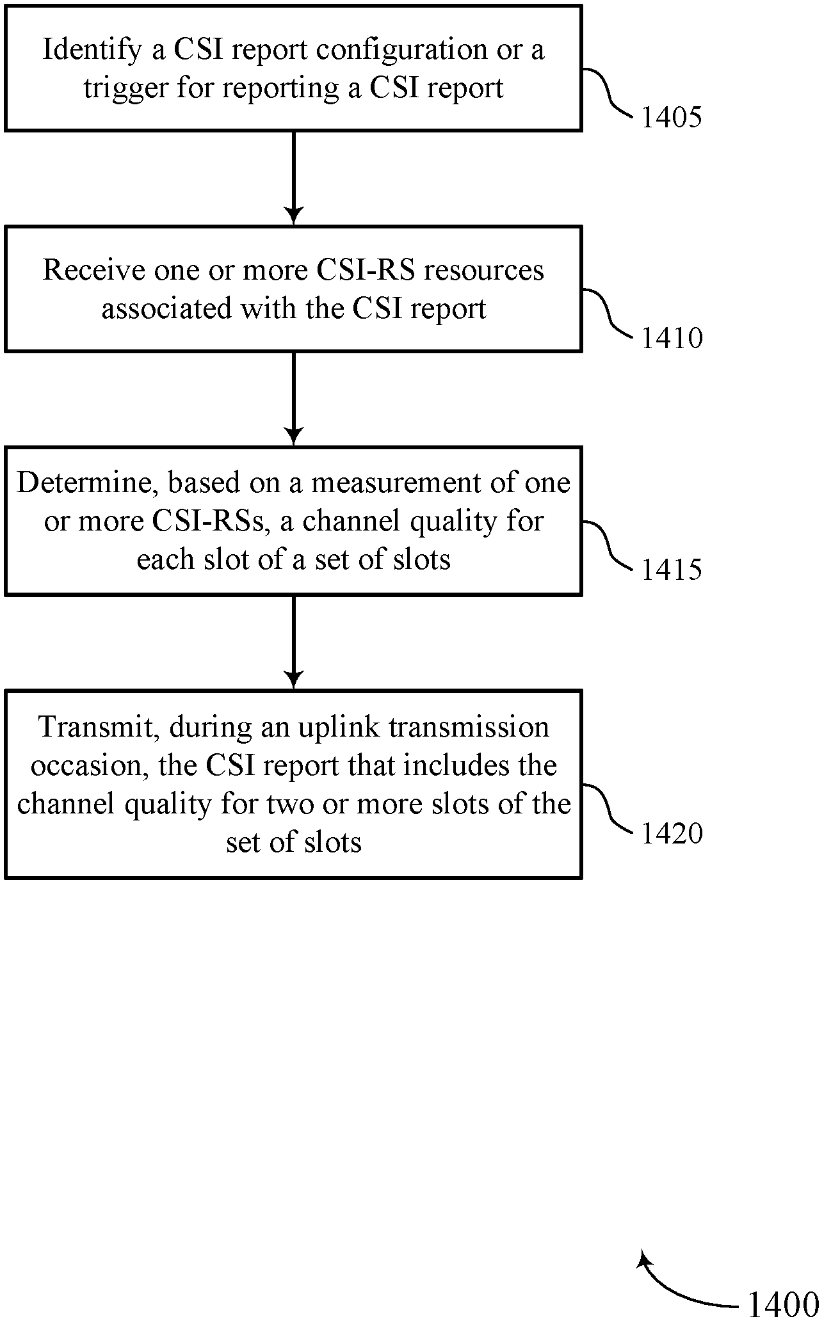
FIGS. 14 through 17 show flowcharts illustrating methods that support multi-slot CQI reporting in accordance with aspects of the present disclosure.

FIG. 14 shows a flowchart illustrating a method 1400 that supports multi-slot CQI reporting in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may identify a CSI report configuration or a trigger for reporting a CSI report. The operations of 1405 may be performed according to the methods described herein. In some examples, aspects of the operations of 1405 may be performed by a reporting component as described with reference to FIGS. 6 through 9.

At 1410, the UE may receive one or more CSI-RS resources associated with the CSI report. The operations of 1410 may be performed according to the methods described herein. In some examples, aspects of the operations of 1410 may be performed by a RS resources component as described with reference to FIGS. 6 through 9.

At 1415, the UE may determine, based on a measurement of one or more CSI-RSs, a channel quality for each slot of a set of slots. The operations of 1415 may be performed according to the methods described herein. In some examples, aspects of the operations of 1415 may be performed by a channel quality component as described with reference to FIGS. 6 through 9.

At 1420, the UE may transmit, during an uplink transmission occasion, the CSI report that includes the channel quality for two or more slots of the set of slots. The operations of 1420 may be performed according to the methods described herein. In some examples, aspects of the operations of 1420 may be performed by a reporting component as described with reference to FIGS. 6 through 9.

Figure 15:
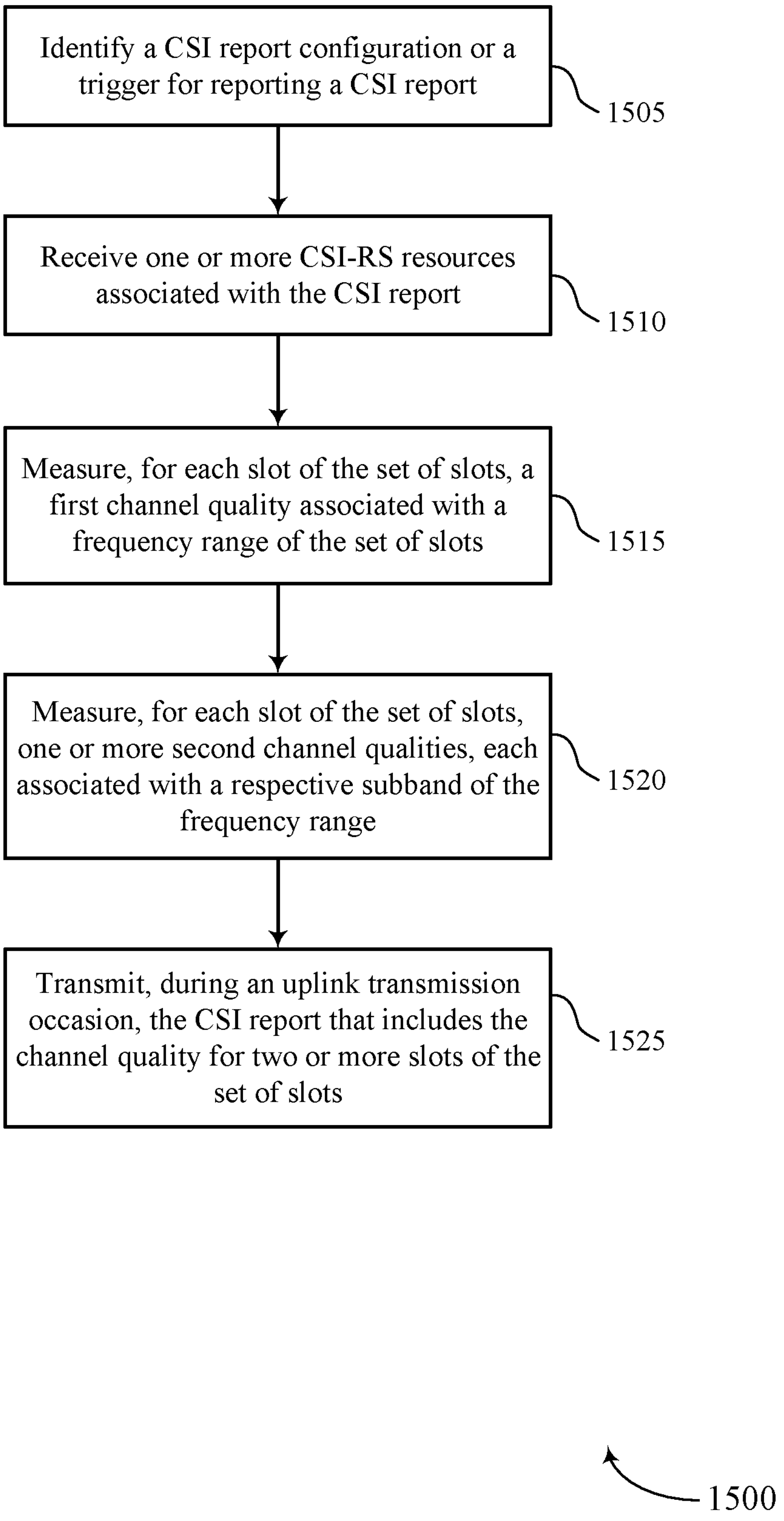

FIG. 15 shows a flowchart illustrating a method 1500 that supports multi-slot CQI reporting in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may identify a CSI report configuration or a trigger for reporting a CSI report. The operations of 1505 may be performed according to the methods described herein. In some examples, aspects of the operations of 1505 may be performed by a reporting component as described with reference to FIGS. 6 through 9.

At 1510, the UE may receive one or more CSI-RS resources associated with the CSI report. The operations of 1510 may be performed according to the methods described herein. In some examples, aspects of the operations of 1510 may be performed by a RS resources component as described with reference to FIGS. 6 through 9.

At 1515, the UE may measure, for each slot of the set of slots, a first channel quality associated with a frequency range of the set of slots. The operations of 1515 may be performed according to the methods described herein. In some examples, aspects of the operations of 1515 may be performed by a channel quality component as described with reference to FIGS. 6 through 9.

At 1520, the UE may measure, for each slot of the set of slots, one or more second channel qualities, each associated with a respective subband of the frequency range. The operations of 1520 may be performed according to the methods described herein. In some examples, aspects of the operations of 1520 may be performed by a channel quality component as described with reference to FIGS. 6 through 9.

At 1525, the UE may transmit, during an uplink transmission occasion, the CSI report that includes the channel quality for two or more slots of the set of slots. The operations of 1525 may be performed according to the methods described herein. In some examples, aspects of the operations of 1525 may be performed by a channel quality component as described with reference to FIGS. 6 through 9.

Figure 16:
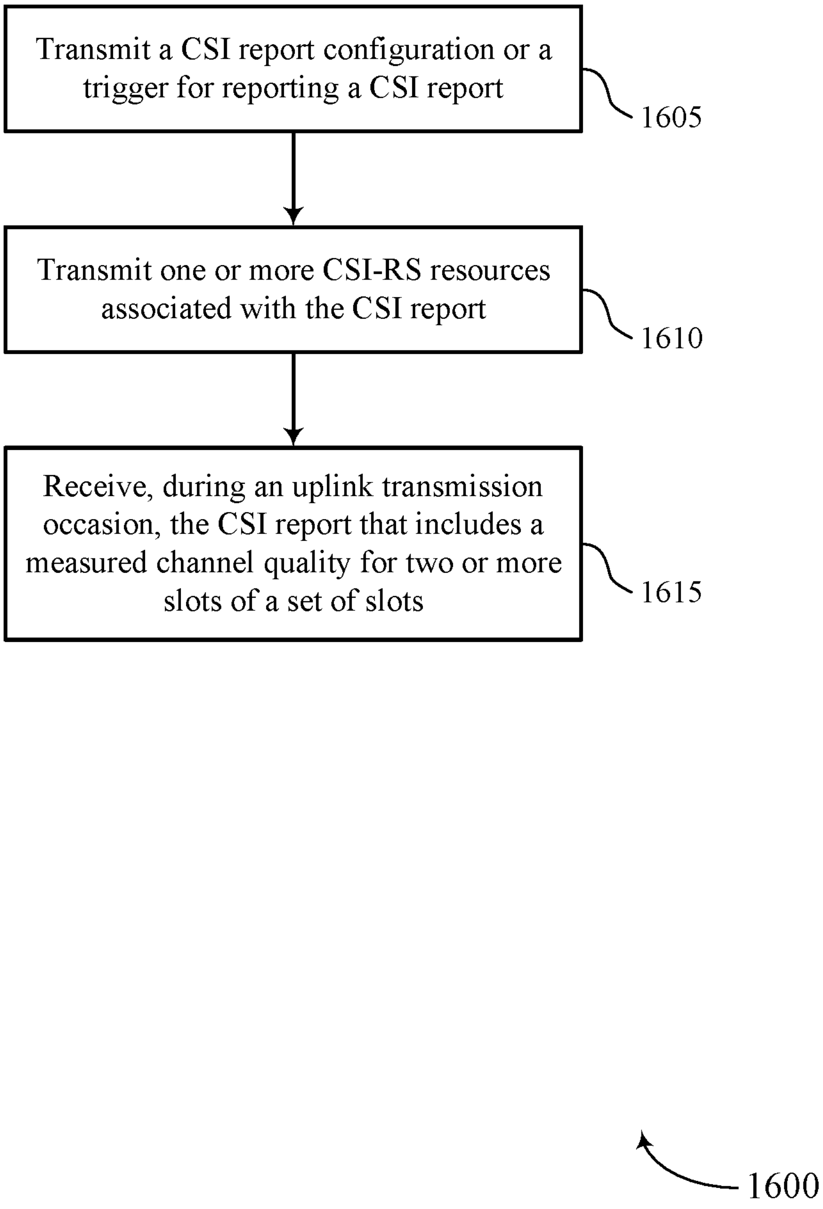

FIG. 16 shows a flowchart illustrating a method 1600 that supports multi-slot CQI reporting in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may transmit a CSI report configuration or a trigger for reporting a CSI report. The operations of 1605 may be performed according to the methods described herein. In some examples, aspects of the operations of 1605 may be performed by a reporting component as described with reference to FIGS. 10 through 13.

At 1610, the base station may transmit one or more CSI-RS resources associated with the CSI report. The operations of 1610 may be performed according to the methods described herein. In some examples, aspects of the operations of 1610 may be performed by a RS resources component as described with reference to FIGS. 10 through 13.

At 1615, the base station may receive, during an uplink transmission occasion, the CSI report that includes a measured channel quality for two or more slots of a set of slots. The operations of 1615 may be performed according to the methods described herein. In some examples, aspects of the operations of 1615 may be performed by a reporting component as described with reference to FIGS. 10 through 13.

Figure 17:
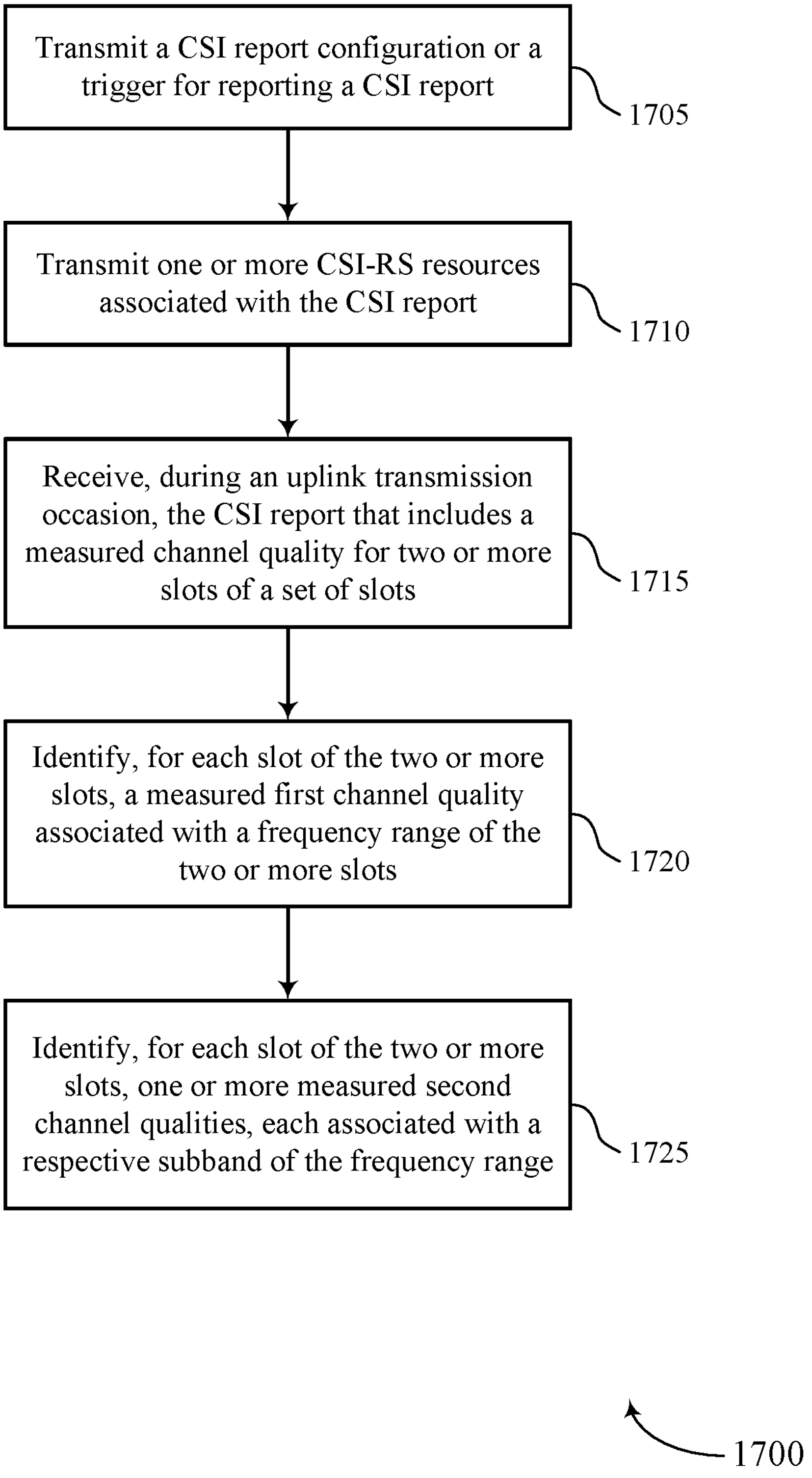

FIG. 17 shows a flowchart illustrating a method 1700 that supports multi-slot CQI reporting in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit a CSI report configuration or a trigger for reporting a CSI report. The operations of 1705 may be performed according to the methods described herein. In some examples, aspects of the operations of 1705 may be performed by a reporting component as described with reference to FIGS. 10 through 13.

At 1710, the base station may transmit one or more CSI-RS resources associated with the CSI report. The operations of 1710 may be performed according to the methods described herein. In some examples, aspects of the operations of 1710 may be performed by a RS resources component as described with reference to FIGS. 10 through 13.

At 1715, the base station may receive, during an uplink transmission occasion, the CSI report that includes a measured channel quality for two or more slots of a set of slots. The operations of 1715 may be performed according to the methods described herein. In some examples, aspects of the operations of 1715 may be performed by a reporting component as described with reference to FIGS. 10 through 13.

At 1720, the base station may identify, for each slot of the two or more slots, a measured first channel quality associated with a frequency range of the two or more slots. The operations of 1720 may be performed according to the methods described herein. In some examples, aspects of the operations of 1720 may be performed by a channel quality component as described with reference to FIGS. 10 through 13.

At 1725, the base station may identify, for each slot of the two or more slots, one or more measured second channel qualities, each associated with a respective subband of the frequency range. The operations of 1725 may be performed according to the methods described herein. In some examples, aspects of the operations of 1725 may be performed by a channel quality component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

Example 1: A method for wireless communication at a UE, comprising: identifying a CSI report configuration or a trigger for reporting a CSI report; receiving one or more CSI-RS resources associated with the CSI report; determining, based at least in part on a measurement of one or more CSI-RSs, a channel quality for each slot of a set of slots; and transmitting, during an uplink transmission occasion, the CSI report that includes the channel quality for two or more slots of the set of slots.

Example 2: The method of example 1, wherein determining the channel quality for each slot of the set of slots comprises at least one of: measuring, for each slot of the set of slots, a first channel quality associated with a frequency range of the set of slots; and measuring, for each slot of the set of slots, one or more second channel qualities, each associated with a respective subband of the frequency range.

Example 3: The method of any of examples 1 or 2, further comprising: generating and reporting the CSI report to include at least one of a plurality of first measured channel qualities that each correspond to the first channel quality measured in a respective slot and a plurality of second measured channel qualities that each correspond to a second channel quality measured across a subband of the respective slot.

Example 4: The method of any of examples 1 to 3, wherein generating the CSI report further comprises: generating each of the plurality of first measured channel qualities based on a same CRI, a same PMI, and a same RI.

Example 5: The method of any of examples 1 to 4, wherein generating the CSI report further comprises: generating each of the plurality of second measured channel qualities associated with a same subband based on a same CRI, a same PMI, and a same RI.

Example 6: The method of any of examples 1 to 5, wherein generating the CSI report further comprises: including, in the CSI report, a first measured channel quality for each slot of the set of slots, and a plurality of second measured channel qualities for each slot of the set of slots, wherein each of the second measured channel qualities for a respective slot is indicated with a delta value with respect to the first measured channel quality for the respective slot.

Example 7: The method of any of examples 1 to 6, wherein generating the CSI report further comprises: including, in the CSI report, a first measured channel quality for a first slot of the set of slots, first measured channel qualities for additional slots of the set of slots, and a plurality of second measured channel qualities for each of the set of slots, wherein each of the first measured channel qualities for the additional slots and each of the plurality of second measured channel qualities is indicated with a delta value with respect to the first measured channel quality for the first slot.

Example 8: The method of any of examples 1 to 7, wherein generating the CSI report further comprises: including, in the CSI report, a first measured channel quality for a first slot of the set of slots, first measured channel qualities for additional slots of the set of slots, a plurality of second measured channel qualities for the first slot, and a plurality of second measured channel qualities for the additional slots, wherein each of the plurality of second measured channel qualities for the first slot are indicated with a delta value with respect to the first measured channel quality for the first slot, and wherein each of the first measured channel qualities for the additional slots and the plurality of second measured channel qualities for the additional slots is indicated with a delta value with respect to a corresponding first measured channel quality or second measured channel quality for the first slot.

Example 9: The method of any of examples 1 to 8, wherein determining the channel quality for each slot of the set of slots comprises determining the channel quality in a CSI reference resource comprising multiple slots.

Example 10: The method of any of examples 1 to 9, further comprising: determining a quantity of slots included in the CSI reference resource and a slot spacing associated with the quantity of slots based at least in part on one or more predetermined values or on a configuration transmitted by a base station via a RRC message or a MAC-CE; and determining the set of slots based at least in part on the determining the quantity of slots and the slot spacing.

Example 11: The method of any of examples 1 to 10, wherein the slot spacing is equal to a quantity of zero slots between a slot of the set of slots and another slot of the set of slots.

Example 12: The method of any of examples 1 to 10, wherein the slot spacing is equal to a quantity of one or more slots between a slot of the set of slots and another slot of the set of slots.

Example 13: The method of any of examples 1 to 12, further comprising: determining a location of the CSI reference resource based at least in part on a quantity of slots between a last slot of the CSI reference resource and an uplink slot for transmitting the CSI report.

Example 14: The method of any of examples 1 to 13, further comprising: determining the quantity of slots between the last slot of the CSI reference resource and the uplink slot based at least in part on a reporting type associated with the CSI report, wherein the reporting type comprises periodic reporting, semi-persistent reporting, or aperiodic reporting.

Example 15: The method of any of examples 1 to 14, further comprising: determining CQI for each slot of the multiple slots of the CSI reference resource assuming a same slot format for each slot of the multiple slots, wherein the slot format comprises at least one or more of: a quantity of OFDM symbols for a PDCCH; a quantity of OFDM symbols for PDSCH symbols and DMRS symbols; a frequency bandwidth configured for CQI calculation; a ratio of PDSCH EPRE to CSI-RS EPRE; a quantity of DMRS symbols; an assumption that the PDSCH symbols do not comprise a DMRS; a PRB bundling size equal to two PRBs for DMRS symbols and PDSCH symbols; and a PMI.

Example 16: The method of any of examples 1 to 15, wherein: the one or more CSI-RS resources are aperiodic CSI-RS resources, the method further comprising receiving a multi-shot transmission for each of the one or more CSI-RS resources over a second set of slots at least partially overlapping the set of slots, wherein each shot of the multi-shot transmission is transmitted in one slot of the set of slots.

Example 17: The method of any of examples 1 to 16, wherein a quantity of shots of the multi-shot transmission and a slot spacing of the multi-shot transmission is configured by a network via a RRC message or a MAC-CE.

Example 18: The method of any of examples 1 to 17, wherein: the one or more CSI-RS resources are periodic or semi-persistent CSI-RS resources, the method further comprising, for each transmission occasion of each of the periodic or semi-persistent CSI-RS resources, receiving a multi-shot transmission for each of the one or more CSI-RS resources over a second set of slots at least partially overlapping the set of slots, wherein each shot of the multi-shot transmission is transmitted in one slot of the second set of slots.

Example 19: The method of any of examples 1 to 18, wherein a quantity of shots of the multi-shot transmission and a slot spacing of the multi-shot transmission is configured by a network via a RRC message or a MAC-CE.

Example 20: The method of any of examples 1 to 19, further comprising: receiving a configuration indicating that the one or more CSI-RS resources are transmitted via repetition, wherein the transmission via repetition comprises that the one or more CSI-RS resources are transmitted using a same spatial transmission filter.

Example 21: The method of any of examples 1 to 20, wherein each of the one or more CSI-RS resources is transmitted in a slot of a second set of slots at least partially overlapping the set of slots.

Example 22: The method of any of examples 1 to 21, further comprising: identifying, from a CSI reference resource comprising multiple slots, an invalid slot for CQI calculation; and refraining from determining the channel quality during the identified invalid slot.

Example 23: The method of any of examples 1 to 22, further comprising: identifying a valid slot, wherein the identified valid slot precedes or follows the identified invalid slot; and measuring the channel quality for the identified valid slot.

Example 24: The method of any of examples 1 to 23, wherein the CSI report configuration comprises a multi-slot CQI configuration.

Example 25: The method of any of examples 1 to 24, further comprising: receiving the one or more CSI-RSs over a second set of slots at least partially overlapping the set of slots, wherein determining the channel quality for each slot of the second set of slots comprises determining multi-slot CQI over the second set of slots, wherein determining the multi-slot CQI comprises determining CQI for each slot of the second set of slots.

Example 26: An apparatus comprising at least one means for performing a method of any of examples 1 to 25.

Example 27: An apparatus for wireless communications comprising a processor; memory coupled with the processor; and instructions stored in the memory and executable by the processor to cause the apparatus to perform a method of any of examples 1 to 25.

Example 28: A non-transitory computer-readable medium storing code for wireless communications, the code comprising instructions executable by a processor to perform a method of any of examples 1 to 25.

Example 29: A method for wireless communication at a base station, comprising: transmitting a CSI report configuration or a trigger for reporting a CSI report; transmitting one or more CSI-RS resources associated with the CSI report; and receiving, during an uplink transmission occasion, the CSI report that includes a measured channel quality for two or more slots of a set of slots.

Example 30: The method of example 29, further comprising identifying the measured channel quality for each slot of the two or more slots based at least in part on receiving the CSI report, wherein the identifying comprises at least one of: identifying, for each slot of the two or more slots, a measured first channel quality associated with a frequency range of the two or more slots; and identifying, for each slot of the two or more slots, one or more measured second channel qualities, each associated with a respective subband of the frequency range.

Example 31: The method of any of examples 29 or 30, wherein the CSI report further comprises at least one of a plurality of first measured channel qualities that each correspond to the first channel quality measured in a respective slot and a plurality of second measured channel qualities that each correspond to a second channel quality measured across a subband of the respective slot.

Example 32: The method of any of examples 29 to 31, wherein each of the plurality of first measured channel qualities is based on a same CRI, a same PMI, and a same RI.

Example 33: The method of any of examples 29 to 32, wherein each of the plurality of second measured channel qualities associated with a same subband is based on a same CRI, a same PMI, and a same RI.

Example 34: The method of any of examples 29 to 33, wherein the CSI report further comprises a first measured channel quality for each slot of the two or more slots, and a plurality of second measured channel qualities for each slot of the two or more slots, wherein each of the second measured channel qualities for a respective slot is indicated with a delta value with respect to the first measured channel quality for the respective slot.

Example 35: The method of any of examples 29 to 34, wherein the CSI report further comprises a first measured channel quality for a first slot of the two or more slots, first measured channel qualities for additional slots of the two or more slots, and a plurality of second measured channel qualities for each of the two or more slots, wherein each of the first measured channel qualities for the additional slots and each of the plurality of second measured channel qualities is indicated with a delta value with respect to the first measured channel quality for the first slot.

Example 36: The method of any of examples 29 to 35, wherein the CSI report further comprises a first measured channel quality for a first slot of the two or more slots, first measured channel qualities for additional slots of the two or more slots, a plurality of second measured channel qualities for the first slot, and a plurality of second measured channel qualities for the additional slots, wherein each of the plurality of second measured channel qualities for the first slot are indicated with a delta value with respect to the first measured channel quality for the first slot, and wherein each of the first measured channel qualities for the additional slots and the plurality of second measured channel qualities for the additional slots is indicated with a delta value with respect to a corresponding first measured channel quality or second measured channel quality for the first slot.

Example 37: The method of any of examples 29 to 36, wherein the measured channel quality for each slot of the two or more slots is measured in a CSI reference resource comprising multiple slots.

Example 38: The method of any of examples 29 to 37, further comprising: transmitting a configuration indicating a quantity of slots included the CSI reference resource and a slot spacing associated with the quantity of slots via a RRC message or a MAC-CE, wherein the set of slots is determined by a UE based at least in part on one or more predetermined values or on the configuration indicating the quantity of slots and the slot spacing.

Example 39: The method of any of examples 29 to 38, wherein the slot spacing is equal to a quantity of zero slots between a slot of the set of slots and another slot of the set of slots.

Example 40: The method of any of examples 29 to 38, wherein the slot spacing is equal to a quantity of one or more slots between a slot of the set of slots and another slot of the set of slots.

Example 41: The method of any of examples 29 to 40, wherein a location of the CSI reference resource is determined by a UE based at least in part on a quantity of slots between a last slot of the CSI reference resource and an uplink slot for transmitting the CSI report.

Example 42: The method of any of examples 29 to 41, further comprising: transmitting an indication of a reporting type associated with the CSI report, wherein the reporting type comprises periodic reporting, semi-persistent reporting, or aperiodic reporting, wherein the quantity of slots between the last slot of the CSI reference resource and the uplink slot is determined by the UE based at least in part on the reporting type.

Example 43: The method of any of examples 29 to 42, wherein receiving the CSI report comprises: receiving CQI for each slot of the multiple slots of the CSI reference resource, wherein the CQI for each slot is determined assuming a same slot format for each slot of the multiple slots, wherein the slot format comprises at least one or more of: a quantity of OFDM symbols for a PDCCH; a quantity of OFDM symbols for PDSCH symbols and DMRS symbols; a frequency bandwidth configured for CQI calculation; a ratio of PDSCH EPRE to CSI-RS EPRE; a quantity of DMRS symbols; an assumption that the PDSCH symbols do not comprise a DMRS; a PRB bundling size equal to two PRBs for DMRS symbols and PDSCH symbols; and a PMI.

Example 44: The method of any of examples 29 to 43, wherein: the one or more CSI-RS resources are aperiodic CSI-RS resources, the method further comprising transmitting a multi-shot transmission for each of the one or more CSI-RS resources over a second set of slots at least partially overlapping the set of slots, wherein the transmitting comprises transmitting each shot of the multi-shot transmission in one slot of the set of slots.

Example 45: The method of any of examples 29 to 44, wherein a quantity of shots of the multi-shot transmission and a slot spacing of the multi-shot transmission is configured by a network via a RRC message or a MAC-CE.

Example 46: The method of any of examples 29 to 45, wherein: the one or more CSI-RS resources are periodic or semi-persistent CSI-RS resources, the method further comprising, for each transmission occasion of each of the periodic or semi-persistent CSI-RS resources, transmitting a multi-shot transmission for each of the one or more CSI-RS resources over a second set of slots at least partially overlapping the set of slots, wherein the transmitting comprises transmitting each shot of the multi-shot transmission in one slot of the second set of slots.

Example 47: The method of any of examples 29 to 46, wherein a quantity of shots of the multi-shot transmission and a slot spacing of the multi-shot transmission is configured by a network via a RRC message or a MAC-CE.

Example 48: The method of any of examples 29 to 47, wherein transmitting the one or more CSI-RS resources comprises: transmitting the one or more CSI-RS resources via repetition, wherein transmitting via the repetition comprises transmitting the one or more CSI-RS resources using a same spatial transmission filter, the method further comprising transmitting a configuration indicating that the one or more CSI-RS resources are transmitted via repetition.

Example 49: The method of any of examples 29 to 48, further comprising: transmitting each of the one or more CSI-RS resources in a slot of a second set of slots at least partially overlapping the set of slots.

Example 50: The method of any of examples 29 to 49, wherein the CSI report configuration comprises a multi-slot CQI configuration.

Example 51: The method of any of examples 29 to 50, further comprising: transmitting the one or more CSI-RSs over a second set of slots at least partially overlapping the set of slots, wherein the measured channel quality for the two or more slots of the second set of slots comprises multi-slot CQI determined over the second set of slots, the multi-slot CQI comprising CQI determined for each slot of the second set of slots.

Example 52: An apparatus comprising at least one means for performing a method of any of examples 1 to 51.

Example 53: An apparatus for wireless communications comprising a processor; memory coupled with the processor; and instructions stored in the memory and executable by the processor to cause the apparatus to perform a method of any of examples 1 to 51.

Example 54: A non-transitory computer-readable medium storing code for wireless communications, the code comprising instructions executable by a processor to perform a method of any of examples 1 to 51.

What is claimed is:

1. An apparatus for wireless communication at a user equipment (UE), comprising:

a processor, memory coupled with the processor; and instructions stored in the memory and executable by the processor to cause the apparatus to:

receive configuration information that indicates a slot spacing between a first slot of a set of slots and a second slot of the set of slots, the set of slots comprising two or more slots for which the UE is requested to report a measured channel quality in a channel state information (CSI) report;

identify a channel state information (CSI) report configuration or a trigger for reporting a CSI report;

receive one or more CSI-reference signal (RS) resources associated with the CSI report;

determine, based at least in part on a measurement of one or more CSI-RSs, a channel quality for each slot of a set of slots; and transmit, during an uplink transmission occasion, the CSI report that includes the channel quality for two or more slots of the set of slots, wherein the CSI report indicates a measured channel quality for the first slot of the set of slots and a measured channel quality for the second slot of the set of slots based at least in part on the slot spacing between the first slot and the second slot.

2. The apparatus of claim 1, wherein the instructions to determine the channel quality for each slot of the set of slots are executable by the processor to cause the apparatus to at least one of:

measure, for each slot of the set of slots, a first channel quality associated with a frequency range of the set of slots;

measure, for each slot of the set of slots, one or more second channel qualities, each associated with a respective subband of the frequency range; and generate the CSI report to include at least one of a plurality of first measured channel qualities that each correspond to the first channel quality measured in a respective slot and a plurality of second measured channel qualities that each correspond to a second channel quality measured across a subband of the respective slot.

3. The apparatus of claim 2, wherein the instructions to generate the CSI report further are executable by the processor to cause the apparatus to:

include, in the CSI report, a first measured channel quality for each slot of the set of slots, and a plurality of second measured channel qualities for each slot of the set of slots, wherein each of the plurality of second measured channel qualities for a respective slot is indicated with a delta value with respect to the first measured channel quality for the respective slot.

4. The apparatus of claim 2, wherein the instructions to generate the CSI report further are executable by the processor to cause the apparatus to:

include, in the CSI report, a plurality of second measured channel qualities for each of the set of slots, wherein each of the plurality of second measured channel qualities is indicated with a delta value with respect to the measured channel quality for the first slot.

5. The apparatus of claim 2, wherein the instructions to generate the CSI report further are executable by the processor to cause the apparatus to:

include, in the CSI report, a plurality of second measured channel qualities for the first slot and a plurality of second measured channel qualities for one or more additional slots, wherein each of the plurality of second measured channel qualities for the first slot are indicated with a first delta value with respect to the measured channel quality for the first slot, and wherein each of the plurality of second measured channel qualities for the one or more additional slots is indicated with a second delta value with respect to a corresponding second measured channel quality for the first slot.

6. The apparatus of claim 1, wherein the instructions are further executable by the processor to cause the apparatus to:

wherein determining the channel quality for each slot of the set of slots comprises determining the channel quality in a CSI reference resource comprising multiple slots.

7. The apparatus of claim 6, wherein the instructions are further executable by the processor to cause the apparatus to:

determine a quantity of slots included in the CSI reference resource based at least in part on one or more predetermined values or on a configuration transmitted by a network node via a radio resource control (RRC) message or a media access control (MAC) control element (MAC-CE); and determine the set of slots based at least in part on the determining the quantity of slots and the slot spacing.

8. The apparatus of claim 6, wherein the instructions are further executable by the processor to cause the apparatus to:

determine a location of the CSI reference resource based at least in part on a quantity of slots between a last slot of the CSI reference resource and an uplink slot for transmitting the CSI report.

9. The apparatus of claim 8, wherein the instructions are further executable by the processor to cause the apparatus to:

determine the quantity of slots between the last slot of the CSI reference resource and the uplink slot based at least in part on a reporting type associated with the CSI report, wherein the reporting type comprises periodic reporting, semi-persistent reporting, or aperiodic reporting.

10. The apparatus of claim 6, wherein the instructions are further executable by the processor to cause the apparatus to:

determine channel quality information (CQI) for each slot of the multiple slots of the CSI reference resource assuming a same slot format for each slot of the multiple slots, wherein the slot format comprises at least one or more of:

a quantity of OFDM symbols for a physical downlink control channel (PDCCH);

a quantity of OFDM symbols for physical downlink shared channel (PDSCH) symbols and demodulation reference signal (DMRS) symbols;

a frequency bandwidth configured for CQI calculation;

a ratio of PDSCH energy per resource element (EPRE) to CSI-RS EPRE;

a quantity of DMRS symbols;

an assumption that the PDSCH symbols do not comprise a DMRS;

a physical resource block (PRB) bundling size equal to two PRBs for DMRS symbols and PDSCH symbols; and a pre-coding matrix indicator (PMI).

11. The apparatus of claim 1, wherein:

the one or more CSI-RS resources are aperiodic CSI-RS resources, wherein the instructions are further executable by the processor to cause the apparatus to:

receive a multi-shot transmission for each of the one or more CSI-RS resources over a second set of slots at least partially overlapping the set of slots, wherein each shot of the multi-shot transmission is transmitted in one slot of the set of slots.

12. The apparatus of claim 1, wherein:

the one or more CSI-RS resources are periodic or semi-persistent CSI-RS resources, wherein the instructions are further executable by the processor to cause the apparatus to, for each transmission occasion of each of the periodic or semi-persistent CSI-RS resources, receive a multi-shot transmission for each of the one or more CSI-RS resources over a second set of slots at least partially overlapping the set of slots, wherein each shot of the multi-shot transmission is transmitted in one slot of the second set of slots.

13. The apparatus of claim 1, wherein the instructions are further executable by the processor to cause the apparatus to:

receive a configuration indicating that the one or more CSI-RS resources are transmitted via repetition, wherein the transmission via repetition comprises that the one or more CSI-RS resources are transmitted using a same spatial transmission filter.

14. An apparatus for wireless communication at a network node, comprising:

a processor, memory coupled with the processor; and instructions stored in the memory and executable by the processor to cause the apparatus to:

transmit configuration information that indicates a slot spacing between a first slot of a set of slots and a second slot of the set of slots, the set of slots comprising two or more slots for which a user equipment (UE) is requested to report a measured channel quality in a channel state information (CSI) report;

transmit a CSI report configuration or a trigger for reporting the CSI report;

transmit one or more CSI-reference signal (RS) resources associated with the CSI report; and receive, during an uplink transmission occasion, the CSI report that includes a measured channel quality for two or more slots of a set of slots, wherein the CSI report indicates a measured channel quality for the first slot of the set of slots and a measured channel quality for the second slot of the set of slots based at least in part on the slot spacing between the first slot and the second slot.

15. The apparatus of claim 14, further comprising identifying the measured channel quality for each slot of the two or more slots based at least in part on receiving the CSI report, and the instructions are further executable by the processor to cause the apparatus to at least one of:

identify, for each slot of the two or more slots, a measured first channel quality associated with a frequency range of the two or more slots; and identify, for each slot of the two or more slots, one or more measured second channel qualities, each associated with a respective subband of the frequency range, wherein the CSI report further comprises at least one of a plurality of first measured channel qualities that each correspond to the first channel quality measured in a respective slot and a plurality of second measured channel qualities that each correspond to a second channel quality measured across a subband of the respective slot.

16. The apparatus of claim 15, wherein the CSI report further comprises a first measured channel quality for each slot of the two or more slots, and a plurality of second measured channel qualities for each slot of the two or more slots, wherein each of the plurality of second measured channel qualities for a respective slot is indicated with a delta value with respect to the first measured channel quality for the respective slot.

17. The apparatus of claim 15, wherein the CSI report further comprises a plurality of second measured channel qualities for each of the two or more slots, wherein each of the plurality of second measured channel qualities is indicated with a delta value with respect to the measured channel quality for the first slot.

18. The apparatus of claim 15, wherein the CSI report further comprises a plurality of second measured channel qualities for the first slot and a plurality of second measured channel qualities for one or more additional slots, wherein each of the plurality of second measured channel qualities for the first slot are indicated with a first delta value with respect to the measured channel quality for the first slot, and wherein each of the plurality of second measured channel qualities for the one or more additional slots is indicated with a delta value with respect to a corresponding second measured channel quality for the first slot.

19. The apparatus of claim 14, wherein the measured channel quality for each slot of the two or more slots is measured in a CSI reference resource comprising multiple slots.

20. The apparatus of claim 19, wherein the instructions are further executable by the processor to cause the apparatus to:

transmit a configuration indicating a quantity of slots included the CSI reference resource via a radio resource control (RRC) message or a media access control (MAC) control element (MAC-CE), wherein the set of slots is determined by a user equipment (UE) based at least in part on one or more predetermined values or on the configuration indicating the quantity of slots and the slot spacing.

21. The apparatus of claim 19, wherein a location of the CSI reference resource is determined by a user equipment (UE) based at least in part on a quantity of slots between a last slot of the CSI reference resource and an uplink slot for transmitting the CSI report.

22. The apparatus of claim 21, wherein the instructions are further executable by the processor to cause the apparatus to:

transmit an indication of a reporting type associated with the CSI report, wherein the reporting type comprises periodic reporting, semi-persistent reporting, or aperiodic reporting, wherein the quantity of slots between the last slot of the CSI reference resource and the uplink slot is determined by the UE based at least in part on the reporting type.

23. The apparatus of claim 19, wherein the instructions to receive the CSI report are executable by the processor to cause the apparatus to:

receive channel quality information (CQI) for each slot of the multiple slots of the CSI reference resource, wherein the CQI for each slot is determined assuming a same slot format for each slot of the multiple slots, wherein the slot format comprises at least one or more of:

a quantity of OFDM symbols for a physical downlink control channel (PDCCH);

a quantity of OFDM symbols for physical downlink shared channel (PDSCH) symbols and demodulation reference signal (DMRS) symbols;

a frequency bandwidth configured for CQI calculation;

a ratio of PDSCH energy per resource element (EPRE) to CSI-RS EPRE;

a quantity of DMRS symbols;

an assumption that the PDSCH symbols do not comprise a DMRS;

a physical resource block (PRB) bundling size equal to two PRBs for DMRS symbols and PDSCH symbols; and a pre-coding matrix indicator (PMI).

24. The apparatus of claim 14, wherein:

the one or more CSI-RS resources are aperiodic CSI-RS resources, wherein the instructions are further executable by the processor to cause the apparatus to:

transmit a multi-shot transmission for each of the one or more CSI-RS resources over a second set of slots at least partially overlapping the set of slots, wherein the transmitting comprises transmitting each shot of the multi-shot transmission in one slot of the set of slots.

25. The apparatus of claim 14, wherein:

the one or more CSI-RS resources are periodic or semi-persistent CSI-RS resources, wherein the instructions are further executable by the processor to cause the apparatus to:

for each transmission occasion of each of the periodic or semi-persistent CSI-RS resources, transmit a multi-shot transmission for each of the one or more CSI-RS resources over a second set of slots at least partially overlapping the set of slots, wherein the transmitting comprises transmitting each shot of the multi-shot transmission in one slot of the second set of slots.

26. The apparatus of claim 14, wherein the instructions to transmit the one or more CSI-RS resources are executable by the processor to cause the apparatus to:

transmit the one or more CSI-RS resources via repetition, wherein transmitting via the repetition are executable by the processor to cause the apparatus to transmit the one or more CSI-RS resources using a same spatial transmission filter; and transmit a configuration indicating that the one or more CSI-RS resources are transmitted via repetition.

27. A method for wireless communication at a user equipment (UE), comprising:

receiving configuration information that indicates a slot spacing between a first slot of a set of slots and a second slot of the set of slots, the set of slots comprising two or more slots for which the UE is requested to report a measured channel quality in a channel state information (CSI) report;

identifying a CSI report configuration or a trigger for reporting the CSI report;

receiving one or more CSI-reference signal (RS) resources associated with the CSI report;

determining, based at least in part on a measurement of one or more CSI-RSs, a channel quality for each slot of a set of slots; and transmitting, during an uplink transmission occasion, the CSI report that includes the channel quality for two or more slots of the set of slots, wherein the CSI report indicates a measured channel quality for the first slot of the set of slots and a measured channel quality for the second slot of the set of slots based at least in part on the slot spacing between the first slot and the second slot.

28. The method of claim 27, wherein determining the channel quality for each slot of the set of slots comprises at least one of:

measuring, for each slot of the set of slots, a first channel quality associated with a frequency range of the set of slots;

measuring, for each slot of the set of slots, one or more second channel qualities, each associated with a respective subband of the frequency range; and generating and reporting the CSI report to include at least one of a plurality of first measured channel qualities that each correspond to the first channel quality measured in a respective slot and a plurality of second measured channel qualities that each correspond to a second channel quality measured across a subband of the respective slot.

29. A method for wireless communication at a network node, comprising:

transmitting configuration information that indicates a slot spacing between a first slot of a set of slots and a second slot of the set of slots, the set of slots comprising two or more slots for which a user equipment (UE) is requested to report a measured channel quality in a channel state information (CSI) report;

transmitting a CSI report configuration or a trigger for reporting the CSI report;

transmitting one or more CSI-reference signal (RS) resources associated with the CSI report; and receiving, during an uplink transmission occasion, the CSI report that includes a measured channel quality for two or more slots of a set of slots, wherein the CSI report indicates a measured channel quality for the first slot of the set of slots and a measured channel quality for the second slot of the set of slots based at least in part on the slot spacing between the first slot and the second slot.

30. The method of claim 29, further comprising:

identifying the measured channel quality for each slot of the two or more slots based at least in part on receiving the CSI report, wherein the identifying comprises at least one of:

identifying, for each slot of the two or more slots, a measured first channel quality associated with a frequency range of the two or more slots; and identifying, for each slot of the two or more slots, one or more measured second channel qualities, each associated with a respective subband of the frequency range, wherein the CSI report further comprises at least one of a plurality of first measured channel qualities that each correspond to the first channel quality measured in a respective slot and a plurality of second measured channel qualities that each correspond to a second channel quality measured across a subband of the respective slot.

* * * * *